(12) United States Patent
Ryabko et al.

(10) Patent No.: US 12,284,427 B2
(45) Date of Patent: Apr. 22, 2025

(54) INFRARED DETECTOR AND INFRARED IMAGE SENSOR INCLUDING THE SAME

(71) Applicant: SAMSUNG ELECTRONICS CO., LTD., Suwon-si (KR)

(72) Inventors: Maxim Vladimirovich Ryabko, Moscow (RU); Anton Nikolaevich Sofronov, St. Petersburg (RU); Sergey Nikolaevich Koptyaev, Nizhniy Tagil (RU)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 244 days.

(21) Appl. No.: 18/118,532

(22) Filed: Mar. 7, 2023

(65) Prior Publication Data
US 2023/0300434 A1    Sep. 21, 2023

(30) Foreign Application Priority Data

Mar. 21, 2022  (RU) .......................... RU2022107356
Nov. 8, 2022   (KR) .......................... 10-2022-0148189

(51) Int. Cl.
H04N 23/23      (2023.01)
G01J 5/10       (2006.01)
H04N 23/52      (2023.01)

(52) U.S. Cl.
CPC ............ *H04N 23/23* (2023.01); *H04N 23/52* (2023.01)

(58) Field of Classification Search
CPC ............ G01J 5/10; H04N 23/23; H04N 23/52
See application file for complete search history.

(56) References Cited

U.S. PATENT DOCUMENTS

| | | | |
|---|---|---|---|
| 5,808,350 A | 9/1998 | Jack et al. | |
| 6,249,002 B1 | 6/2001 | Butler | |
| 6,900,440 B2 | 5/2005 | Reed et al. | |
| 7,098,775 B2 | 8/2006 | Perlo et al. | |
| 7,362,224 B2 | 4/2008 | Zambon | |
| 7,655,909 B2* | 2/2010 | Schimert | G01J 5/0804 |
| | | | 250/353 |
| 7,667,200 B1 | 2/2010 | Watts et al. | |

(Continued)

FOREIGN PATENT DOCUMENTS

| | | |
|---|---|---|
| CN | 1625335 A | 6/2005 |
| CN | 1725002 A | 1/2006 |

(Continued)

OTHER PUBLICATIONS

_ Resolution issues in InSb focal plane array system design; Davis; et al. 1998 (Year: 1998).*

(Continued)

*Primary Examiner* — Luis Perez-Fuentes
(74) *Attorney, Agent, or Firm* — Sughrue Mion, PLLC

(57) ABSTRACT

An infrared detector includes a substrate in which a void is formed, a micro-resonator suspended over the void, an infrared absorber on an upper surface of the micro-resonator, a thermal isolation bridge supporting the micro-resonator, a first waveguide optically coupled with the micro-resonator, a second waveguide intersecting the first waveguide and optically coupled with the micro-resonator, a light source optically coupled with the first waveguide, and a photodetector optically coupled with the second waveguide.

20 Claims, 23 Drawing Sheets

(56) References Cited

U.S. PATENT DOCUMENTS

| | | | |
|---|---|---|---|
| 7,820,970 B1* | 10/2010 | Shaw | G01J 5/44 250/338.1 |
| 7,898,071 B2 | 3/2011 | Bakke et al. | |
| 8,101,458 B2 | 1/2012 | Kumar et al. | |
| 8,171,801 B2 | 5/2012 | Le Noc et al. | |
| 8,455,829 B2 | 6/2013 | Bluzer | |
| 8,610,070 B2 | 12/2013 | Schimert et al. | |
| 8,941,203 B2* | 1/2015 | Wehner | H01L 31/02325 257/E31.093 |
| 8,975,583 B2 | 3/2015 | Tinkler et al. | |
| 9,377,366 B2 | 6/2016 | Chia | |
| 9,472,697 B2* | 10/2016 | Wehner | H01L 31/1013 |
| 9,859,188 B2 | 1/2018 | Cahill et al. | |
| 9,909,926 B2 | 3/2018 | Hopper et al. | |
| 10,151,638 B2 | 12/2018 | Tao et al. | |
| 10,247,676 B1 | 4/2019 | Shaw | |
| 10,788,370 B2 | 9/2020 | Herrmann et al. | |
| 10,911,696 B2 | 2/2021 | Choiniere et al. | |
| 2003/0141453 A1 | 7/2003 | Reed et al. | |
| 2005/0116828 A1 | 6/2005 | Perlo et al. | |
| 2005/0163185 A1 | 7/2005 | Vahala et al. | |
| 2006/0087430 A1 | 4/2006 | Zambon | |
| 2007/0187602 A1 | 8/2007 | Wennmacher et al. | |
| 2008/0164592 A1 | 7/2008 | Bakke et al. | |
| 2010/0154554 A1 | 6/2010 | Le Noc et al. | |
| 2011/0027941 A1 | 2/2011 | Kumar et al. | |
| 2011/0174978 A1 | 7/2011 | Forg et al. | |
| 2011/0180710 A1 | 7/2011 | Bluzer | |
| 2012/0038778 A1 | 2/2012 | Klager et al. | |
| 2013/0142215 A1 | 6/2013 | Nemirovsky et al. | |
| 2013/0235210 A1 | 9/2013 | Tinkler et al. | |
| 2014/0152772 A1 | 6/2014 | Feyh et al. | |
| 2014/0264647 A1 | 9/2014 | Katragadda et al. | |
| 2014/0297756 A1 | 10/2014 | Qureshi | |
| 2016/0097681 A1 | 4/2016 | Buchan et al. | |
| 2016/0379911 A1 | 12/2016 | Cahili et al. | |
| 2017/0343419 A1 | 11/2017 | Hopper et al. | |
| 2018/0278693 A1 | 9/2018 | Binder et al. | |
| 2018/0278694 A1 | 9/2018 | Binder et al. | |
| 2018/0335347 A1 | 11/2018 | Herrmann et al. | |
| 2018/0364153 A1 | 12/2018 | Carr | |
| 2018/0375940 A1 | 12/2018 | Binder et al. | |
| 2019/0032114 A1 | 1/2019 | Trivedi | |
| 2020/0018714 A1 | 1/2020 | Carr | |
| 2020/0204744 A1 | 6/2020 | Choiniere et al. | |
| 2021/0389183 A1 | 12/2021 | Guo et al. | |

FOREIGN PATENT DOCUMENTS

| | | |
|---|---|---|
| CN | 100479654 C | 4/2009 |
| CN | 1725002 B | 4/2013 |
| CN | 103229320 A | 7/2013 |
| CN | 108291840 B | 2/2021 |
| DE | 10 2014 008315 A1 | 12/2015 |
| EP | 1 619 342 A1 | 1/2006 |
| EP | 1 619 342 B1 | 4/2009 |
| EP | 3 017 469 B1 | 9/2017 |
| EP | 3 465 150 B1 | 7/2021 |
| GB | 2542814 A | 4/2017 |
| RU | 2 082 116 C1 | 4/1997 |
| RU | 2 258 207 C1 | 8/2005 |
| RU | 2 753 158 C1 | 8/2021 |
| WO | 01/63232 A1 | 8/2001 |
| WO | 2006/038213 A2 | 4/2006 |
| WO | 2010/069036 A1 | 6/2010 |
| WO | 2010/076783 A1 | 7/2010 |
| WO | 2011/094206 A1 | 8/2011 |
| WO | 2011/151756 A2 | 12/2011 |
| WO | 2012/021776 A2 | 2/2012 |
| WO | 2014/085647 A1 | 6/2014 |
| WO | 2015000591 A2 | 1/2015 |
| WO | 2017/048189 A1 | 3/2017 |
| WO | 2017/089604 A1 | 6/2017 |
| WO | 2017/127570 A1 | 7/2017 |
| WO | 2017/207963 A1 | 12/2017 |
| WO | 2019/050516 A1 | 3/2019 |
| WO | 2020/070749 A1 | 4/2020 |

OTHER PUBLICATIONS

_Micro-photonic thermal detector and imager; Watts; 2016; (Year: 2016).*

Communication dated Jul. 18, 2023, issued by the European Patent Office in counterpart European Application No. 23161818.2.

Optical Microresonator Theory, Optical Microresonators, Optical Science, 2008, vol. 138, Springer, New York, NY. (33 pages total).

Watts, Michael R. et al., "Microphotonic Thermal Detectors and Images", Proc. SPIE, vol. 7194, 2009. (8 pages total).

Communication issued Oct. 17, 2022 by the Russian Federal Service for Intellectual Property in Russian Patent Application No. 2022107356.

* cited by examiner

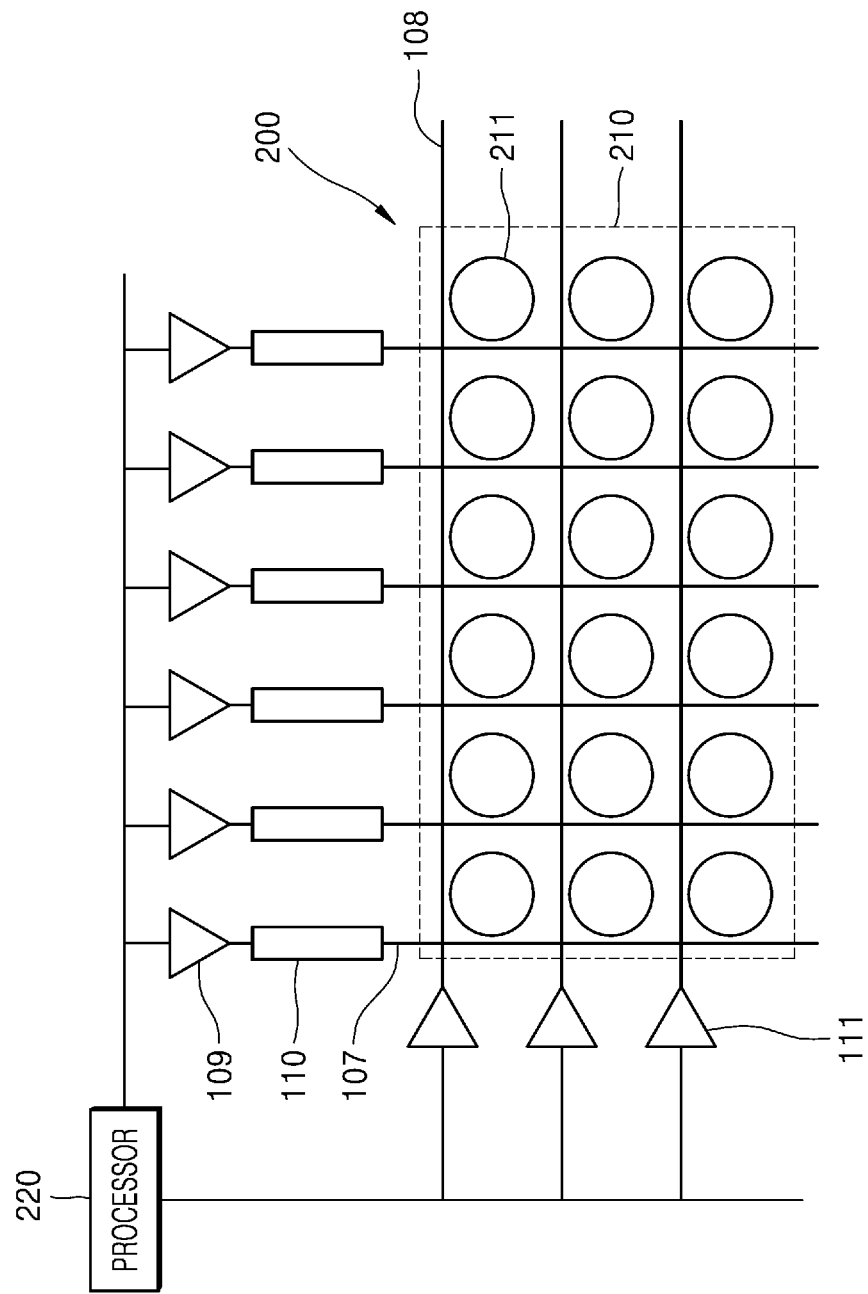

INFRARED DETECTOR AND INFRARED IMAGE SENSOR INCLUDING THE SAME

CROSS-REFERENCE TO RELATED APPLICATION

This application is based on and claims priority under 35 U.S.C. § 119 to Korean Patent Application No. 10-2022-0148189, filed on Nov. 8, 2022, in the Korean Intellectual Property Office and Russian Patent Application No. 2022107356, filed on Mar. 21, 2022, the disclosures of which are incorporated by reference herein in their entirety.

BACKGROUND

1. Field

The disclosure relates to an infrared detector and an infrared image sensor including the same.

2. Description of Related Art

A material having a certain temperature emits light of a specific wavelength band by black-body radiation, and in this case, the material emits infrared light having a wavelength band of about 7 μm to about 14 μm with respect to a peripheral object at room temperature. To detect such emitted infrared light, uncooled infrared detectors have commonly been used. As uncooled infrared detectors, bolometer-type infrared detectors using the temperature change of materials caused by incident infrared light are mainly used. However, such bolometer-type uncooled infrared detectors are not compatible with the manufacturing processes for general semiconductor devices, such as complementary metal oxide semiconductors (CMOS). As a result, the bolometer-type uncooled infrared detectors introduce a relatively high production cost, and it is difficult to achieve a high resolution. On the other hand, infrared detectors which are compatible with general semiconductor structures have low sensitivity due to thermal noise.

SUMMARY

Apparatus consistent with this disclosure provide an infrared detector which may be mass-produced through a general semiconductor manufacturing process and an infrared image sensor including the infrared detector.

Such an infrared detector has a reduced pixel size and an improved sensitivity. Apparatus consistent with this disclosure may provide an infrared image sensor including such an infrared detector.

Additional aspects will be set forth in the description which follows. Further aspects will be inherent or apparent from the description to one skilled in the art, or may be learned by practice of the presented embodiments of the disclosure.

According to an aspect of the disclosure, an infrared detector includes a substrate in which a void is formed, a micro-resonator disposed over the void of the substrate, an infrared absorber disposed on an upper surface of the micro-resonator, a thermal isolation bridge supporting the micro-resonator, a first waveguide optically coupled with the micro-resonator, a second waveguide intersecting the first waveguide and optically coupled with the micro-resonator, a light source optically coupled with the first waveguide, and a photodetector optically coupled with the second waveguide.

The infrared detector may further include a modulator disposed on an optical path between the light source and the first waveguide and configured to frequency-modulate light emitted from the light source.

The infrared detector may further include a support plate disposed on a lower surface of the micro-resonator, and a bridge layer disposed on an upper surface of the substrate, wherein the support plate, the bridge layer, and the thermal isolation bridge are formed in an integrated manner on the same plane.

The thermal isolation bridge may extend between the support plate and the bridge layer.

The thermal isolation bridge may include a first thermal isolation bridge extending between a lateral surface of the support plate and a lower surface of the first waveguide and a second thermal isolation bridge extending between another lateral surface of the support plate and a lower surface of the second waveguide.

The infrared detector may further include a support plate disposed below the micro-resonator, a first insulating layer disposed between the support plate and the micro-resonator and a second insulating layer disposed between the micro-resonator and the infrared absorber, wherein the first waveguide is disposed in the first insulating layer and the second waveguide is disposed in the second insulating layer.

The infrared detector may further include a bridge fixing layer integrated with the thermal isolation bridge, the micro-resonator, and the first and second waveguides on the same plane, wherein the thermal isolation bridge extends between the bridge fixing layer and the micro-resonator.

For example, the micro-resonator may be in the shape of a circular flat disc having a diameter or width which of at least 1 μm and not more than 20 μm.

The first waveguide, the second waveguide, and the micro-resonator may include the same material, and may be arranged on the same plane.

According to another aspect of the disclosure, an infrared image sensor includes a pixel array including a plurality of infrared detection pixels arranged in a two-dimensional (2D) manner, a plurality of first waveguides extending in a first direction, a plurality of second waveguides extending in a second direction which intersects the first direction, a light source configured to provide light to the plurality of first waveguides, and a photodetector configured to measure an intensity of light transmitted through the plurality of second waveguides, wherein each of the plurality of infrared detection pixels includes a substrate in which void is formed, a micro-resonator disposed over the void of the substrate, an infrared absorber disposed on an upper surface of the micro-resonator, and a thermal isolation bridge supporting the micro-resonator, and wherein the plurality of first waveguides are optically coupled with the micro-resonators of the plurality of infrared detection pixels arranged in the first direction, respectively, and the plurality of second waveguides are optically coupled with the micro-resonators in the plurality of infrared detection pixels arranged in the second direction, respectively.

The infrared image sensor may further include a processor configured to calculate a change in a resonant wavelength of the micro-resonator of each of the plurality of infrared detection pixels based on a change in an output of the photodetector.

The light source may include a plurality of light sources configured to provide light to each of the plurality of first waveguides, and the photodetector may include a plurality of photodetectors respectively connected to the plurality of second waveguides.

The infrared image senor may further include a plurality of modulators each arranged between the first waveguide and the light source which correspond to each other, wherein the plurality of modulators frequency-modulate light to have different wavelength distributions from each other.

The plurality of infrared detection pixels arranged in the first direction to be optically coupled with one of the plurality of first waveguides may be arranged in a zigzag form.

The infrared image sensor may further include a demultiplexer disposed on an optical path between the light source and the plurality of first waveguides, and a multiplexer disposed on an optical path between the plurality of second waveguides and the photodetector.

The infrared image sensor may further include a plurality of modulators arranged on an optical path between the demultiplexer and the plurality of first waveguides and respectively connected to corresponding first waveguides of the plurality of first waveguides, wherein the plurality of modulators frequency-modulate light to have different wavelength distributions from each other.

The infrared image sensor may further include a modulator disposed on an optical path between the light source and the photodetector.

Each of the plurality of infrared detection pixels of the infrared image sensor may include a support plate disposed on a lower surface of the micro-resonator, and a bridge layer disposed on an upper surface of the substrate, and the support plate, the bridge layer, and the thermal isolation bridge may be formed in an integrated manner on a same plane.

The plurality of first waveguides, the plurality of second waveguides and the micro resonators of the infrared image sensor may include a same material and may be arranged on a same plane.

According to another aspect of the disclosure, an infrared image sensor includes a pixel array including a plurality of infrared detection pixels arranged in a 2D manner, a plurality of first waveguides extending in a first direction, a light source configured to provide light to the plurality of first waveguides, and a visible light image sensor facing the pixel array and including a plurality of visible light detection pixels arranged in a 2D manner to respectively correspond to the plurality of infrared detection pixels, wherein each of the plurality of infrared detection pixels includes a substrate in which a void is formed, a micro-resonator disposed over the void of the substrate, an infrared absorber disposed on an upper surface of the micro-resonator, and a thermal isolation bridge supporting the micro-resonator, and wherein the plurality of first waveguides are optically coupled with the micro-resonators in the plurality of infrared detection pixels arranged in the first direction, respectively.

BRIEF DESCRIPTION OF THE DRAWINGS

The above and other aspects, features, and advantages of example embodiments of the disclosure will be more apparent from the following description taken in conjunction with the accompanying drawings, in which:

FIG. 8 is a schematic view of a structure of an infrared image sensor according to an example embodiment;

DETAILED DESCRIPTION

Figure 1A:
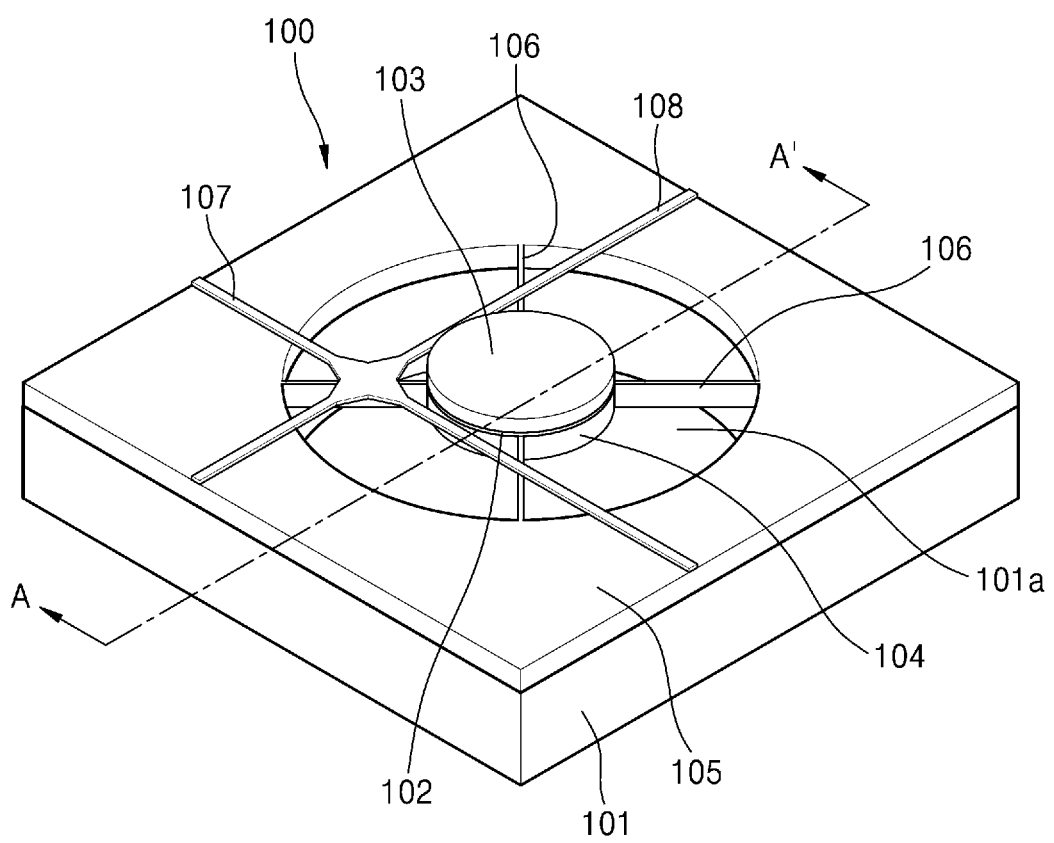
FIGS. 1A and 1B are respectively a perspective view and a partial cut view schematically illustrating a structure of an infrared detector according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, an infrared detector and an infrared image sensor including the same are described in detail with reference to the attached drawings. In the drawings, like reference numerals in the drawings denote like elements, and sizes of components in the drawings may be exaggerated for clarity and convenience of explanation. Meanwhile, embodiments described below are provided merely as an example, and various modifications may be made from the embodiments.

It will be understood that when a component is referred to as being "on" another component or on "upper part" of another component, the component can be directly on the other component or over the other component in a non-contact manner. This also applies to other positional prepositions. As used herein, the singular forms "a," "an" and "the" are intended to include the plural forms as well, unless the context clearly indicates otherwise. When a portion "includes" an element, another element may be further included, rather than excluding the existence of the other element, unless otherwise described.

The use of the terms "a," "an," and "the" and similar referents are to be construed to cover both the singular and the plural. The operations of all methods described herein can be performed in any suitable order unless otherwise indicated herein or otherwise clearly contradicted by context, and embodiments are not limited to the described order of the operations.

In addition, the terms " . . . portion," "module," etc., described in the specification refer to a unit for processing at least one function or operation, which can be implemented by hardware (such as a processor) or software, or a combination of a hardware and a software.

The connecting lines, or connectors shown in the various figures presented are intended to represent exemplary functional relationships and/or physical or logical couplings between the various elements, and thus it should be noted that many alternative or additional functional relationships, physical connections or logical connections may be present in a practical device.

The use of any and all examples, or exemplary language provided herein, is intended merely to better illuminate technical ideas and does not pose a limitation on the scope of embodiments unless otherwise claimed.

Figure 1B:
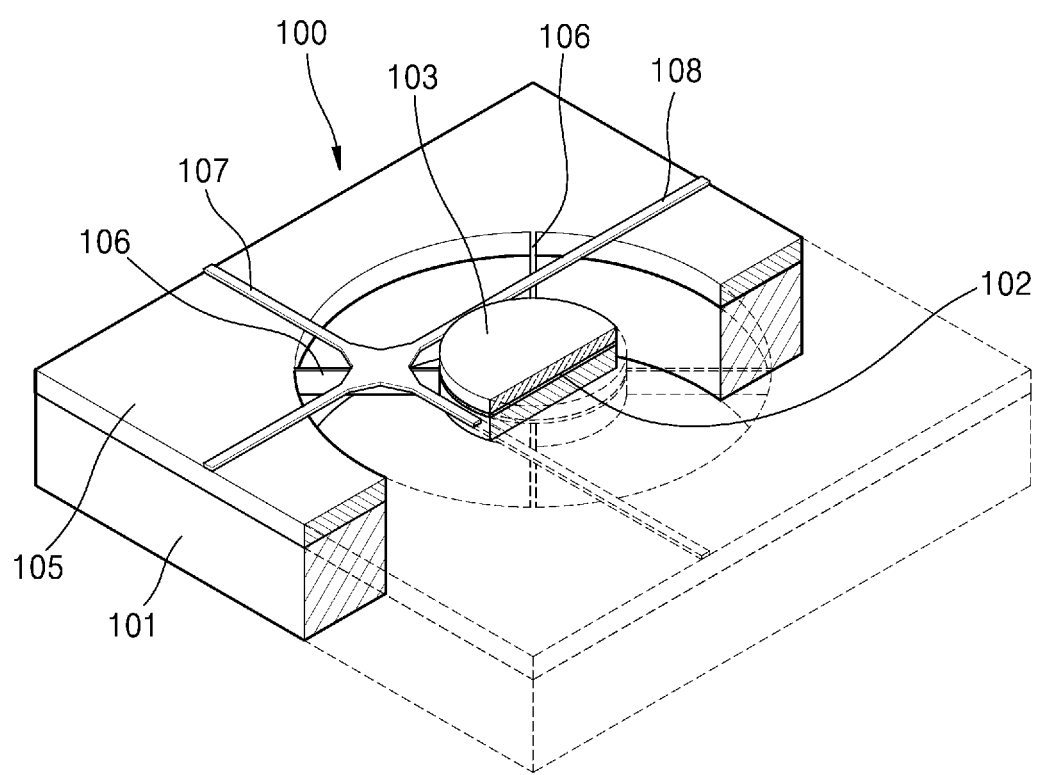
Figure 2:
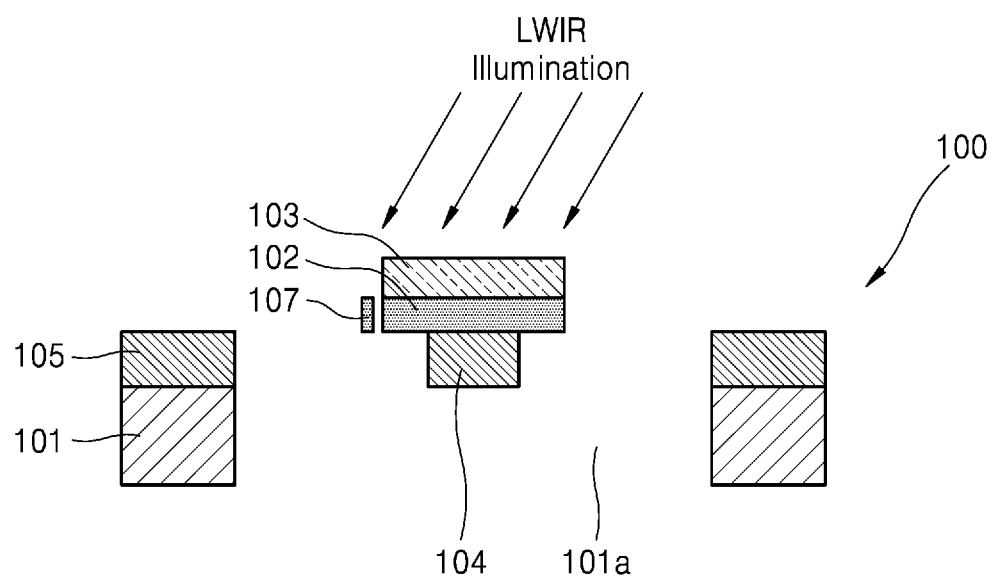
FIG. 2 is a cross-sectional view taken along line A-A' of FIG. 1A to schematically illustrate the structure of the infrared detector of FIGS. 1A and 1B according to an example embodiment.

FIGS. 1A and 1B are respectively a perspective view and a partial cut view schematically illustrating a structure of an infrared detector according to an embodiment. FIG. 2 is a cross-sectional view taken along A-A' line of FIG. 1A to schematically illustrate the structure of an infrared detector of FIGS. 1A and 1B according to an embodiment. With reference to FIGS. 1A, 1B, and 2, an infrared detector 100 according to an embodiment may include a substrate 101 in which an empty space, or void, 101a is formed, a micro-resonator 102 disposed, such as by suspension, over the empty space 101a of the substrate 101, an infrared absorber 103 disposed on an upper surface of the micro-resonator 102, a thermal isolation bridge 106 supporting the micro-resonator 102, a first waveguide 107 optically coupled with the micro-resonator 102, and a second waveguide 108 intersecting the first waveguide 107 and optically coupled with the micro-resonator 102.

The substrate 101 may include a semiconductor material. For example, the substrate 101 may include at least one of silicon (Si), germanium (Ge), and a compound semiconductor. In the substrate 101, the empty space 101a may be formed by, for example, an etching process. The empty space 101a may penetrate an upper surface and a lower surface of the substrate 101. However, the disclosure is not limited thereto, and the empty space 101a may be formed by etching only a part of the inside of the substrate 101 through the upper surface of the substrate 101.

The micro-resonator 102 may include a semiconductor material or an nitride of a semiconductor material. For example, the micro-resonator 102 may include silicon (Si) or a silicon nitride (SiN). The micro-resonator 102 may be in the shape of a flat plate. Although the drawings illustrate the micro-resonator 102 as having the shape of circular flat disc, the disclosure is not limited thereto, and the micro-resonator 102 may also have a polygonal shape. The micro-resonator 102 may be disposed over the empty space 101a in the substrate 101. In other words, the empty space 101a of the substrate 101 may be under the micro-resonator 102. A diameter or a width of the micro-resonator 102 may be less than a size of the empty space 101a. For example, the diameter or the width of the micro-resonator 102 may be greater than or equal to about 1 μm and less than or equal to about 20 μm. Alternatively, the diameter or the width of the micro-resonator 102 may be greater than or equal to about 3 μm and less than or equal to about 10 μm. A resonant wavelength of light resonating in the micro-resonator 102 may be determined according to a shape and size of the micro-resonator 102.

The thermal isolation bridge 106 may function as a support to suspend the micro-resonator 102 in or over the empty space 101a of the substrate 101. To this end, the thermal isolation bridge 106 may have a long rod shape extending from the upper surface of the substrate 101 to the lower surface of the micro-resonator 102. To stably support the micro-resonator 102, the infrared detector 100 may include a plurality of thermal isolation bridges 106. For example, FIGS. 1A and 1B illustrate that four thermal isolation bridges 106 are arranged radially with respect to the center of the micro-resonator 102. However, this is only an example, and the number and arrangement of thermal isolation bridges 106 are not limited thereto. The infrared detector 100 may further include a support plate 104 arranged on the lower surface of the micro-resonator 102 and a bridge layer 105 arranged on the upper surface of the substrate 101. The support plate 104, the bridge layer 105, and the thermal isolation bridge 106 may include the same material and may be integrated on the same plane. For example, the support plate 104 and the thermal isolation bridge 106 may be formed by patterning the bridge layer 105 covering the upper surface of the substrate 101. The thermal isolation bridge 106 may extend between the support plate 104 and the bridge layer 105.

Moreover, the thermal isolation bridge 106 may delay the thermal exchange between the micro-resonator 102 and the substrate 101. The thermal conductivity of the thermal isolation bridge 106 may be sufficiently low to accumulate heat in the micro-resonator 102 for certain time. The heat of the micro-resonator 102 may not easily flow to the substrate 101 through the thermal isolation bridge 106, which leads to improved sensitivity of the infrared detector 100. In addition, to measure infrared rays at a high enough frame rate, the thermal conductivity of the thermal isolation bridge 106 may not be too small such that the heat of the micro-resonator 102 is emitted to the substrate 101 in a certain time. The thermal isolation bridge 106 having the thermal conductivity that satisfies such condition may include a semiconductor, a semiconductor nitride, or a semiconductor oxide. For example, the support plate 104, the bridge layer 105, and the thermal isolation bridge 106 may include at least one of silicon (Si), silicon nitride (SiN), and silicon oxide ($SiO_2$). When the substrate 101 includes silicon and the bridge layer 105 include a silicon oxide, the infrared detector 100 may be manufactured using a silicon-on-insulator (SOI) substrate.

The micro-resonator 102 may be disposed or arranged on the upper surface of the support plate 104, and the infrared absorber 103 may be disposed or arranged on the upper surface of the micro-resonator 102. The infrared absorber 103 may have the same flat plate shape as the micro-resonator 102, however, the disclosure is not limited thereto. The infrared absorber 103 may absorb infrared rays to generate heat. For example, the infrared absorber 103 may be configured to absorb longwave infrared (LWIR) light having a wavelength band greater than or equal to about 7 μm and less than or equal to about 14 μm. To this end, the infrared absorber 103 may include silicon nitride (SiN, $Si_3N_4$) or silicon doped with a p-type dopant (p-Si). The doping concentration of p-type silicon (p-Si) may be, for example, about $10^{19}$ cm$^{-3}$ to about $10^{20}$ cm$^{-3}$. In this case, an absorption coefficient of the p-type silicon (p-Si) for infrared light having a wavelength band ranging from 7 μm to 14 μm may be almost the same as an absorption coefficient of the silicon nitride (SiN, $Si_3N_4$).

The first waveguide 107 and the second waveguide 108 may include the same materials as the micro-resonator 102. For example, the first waveguide 107 and the second waveguide 108 may include silicon (Si) or silicon nitride (SiN). In addition, the first waveguide 107 and the second waveguide 108 may be arranged on the same plane as the micro-resonator 102. For example, the first waveguide 107 and the second waveguide 108 may be arranged on the bridge layer 105. Then, the first waveguide 107, the second waveguide 108, and the micro-resonator 102 may be formed simultaneously with the same material.

The first waveguide 107 and the second waveguide 108 may be adjacent to a lateral surface of the micro-resonator 102 and intersect each other. For example, the first waveguide 107 may be close to one point on the lateral surface of the micro-resonator 102 and extend in a first direction while the second waveguide 108 may be close to another point on the lateral surface of the micro-resonator 102 and extend in a second direction, which is different from the first direction. The first and second waveguides 107 and 108 may be arranged in a direction parallel with a tangential direction of the micro-resonator 102 but may not be in physical contact with the micro-resonator 102. For example, a minimum distance between the micro-resonator 102 and the first waveguide 107 or a minimum distance between the micro-resonator 102 and the second waveguide 108 may be greater than 0 and may be less than or equal to five times the width of the first and second waveguides 107 and 108. The minimum distance between the micro-resonator 102 and the first waveguide 107 or the minimum distance between the micro-resonator 102 and the second waveguide 108 may be less than or equal to two times the width of the first and second waveguides 107 and 108. The minimum distance may be, for example, 0.5 times to one times the width of the first waveguide 107 or the second waveguide 108. As such, the first and second waveguides 107 and 108 may be optically coupled with the micro-resonator 102 while not affecting a resonant wavelength of the micro-resonator 102.

Figure 3:
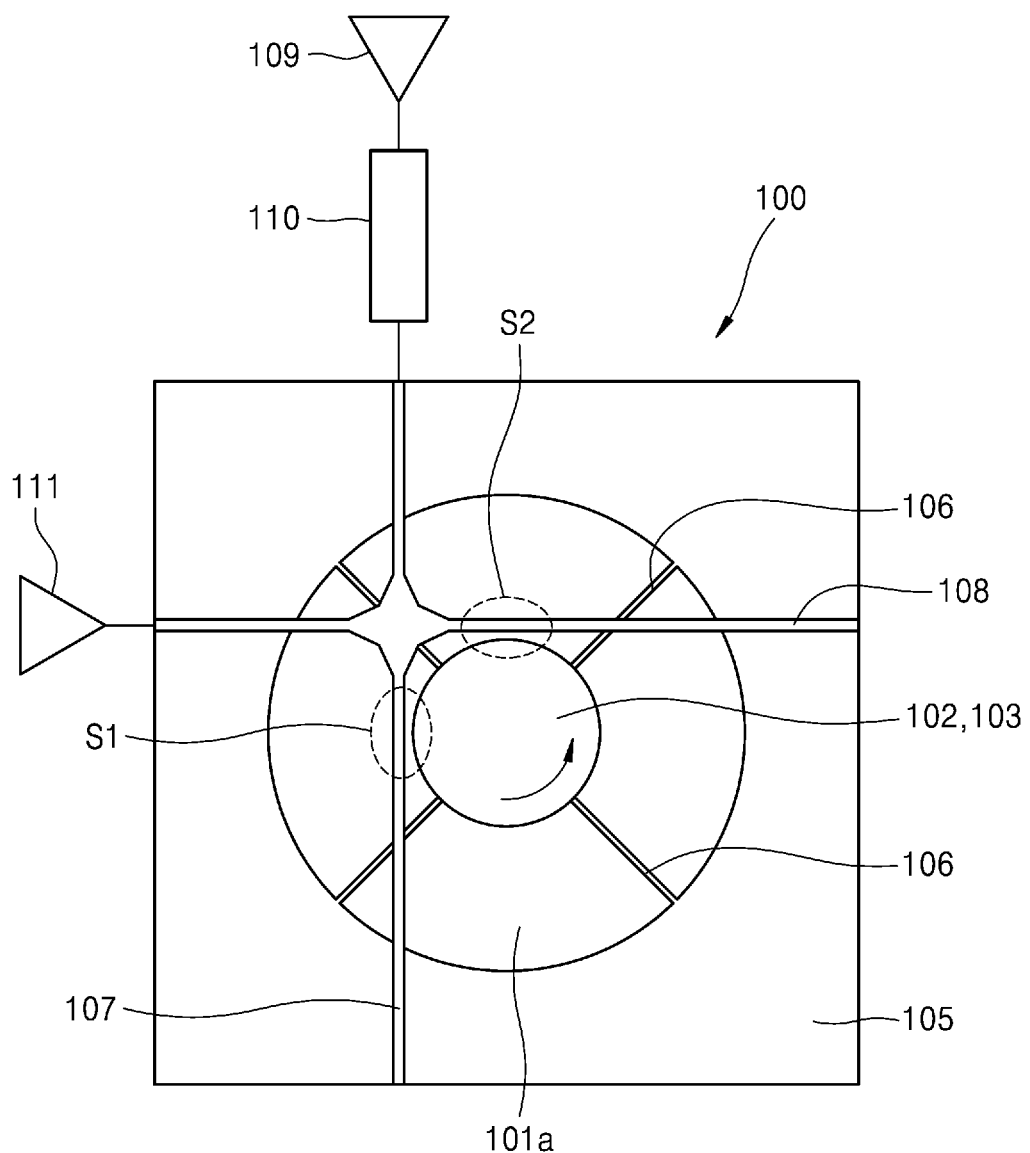
FIG. 3 is a plan view schematically illustrating the structure of the infrared detector of FIGS. 1A and 1B according to an example embodiment.

FIG. 3 is a plan view schematically illustrating the structure of an infrared detector of FIGS. 1A and 1B according to an embodiment. With reference to FIG. 3, the infrared detector 100 may further include a light source 109 optically connected to the first waveguide 107 and configured to provide light to the micro-resonator 102 and a photodetector 111 optically connected to the second waveguide 108 and configured to measure an intensity of resonant light in the micro-resonator 102. The light source 109 may be a laser diode configured to emit light having a wavelength band including the resonant wavelength of the micro-resonator 102. For example, the light source 109 may be a tunable laser capable of adjusting a wavelength of emitted light, however, the disclosure is not limited thereto. The infrared detector 100 may further include a modulator 110 configured to frequency-modulate light emitted from the light source 109. The modulator 110 may be arranged on an optical path between the light source 109 and the first waveguide 107 and provide frequency-modulated light to the micro-resonator 102 through the first waveguide 107. When a single infrared detector 100 is used solely, the modulator 110 may be omitted.

In the infrared detector 100 according to the embodiment, light emitted from the light source 109 may travel along the first waveguide 107. A part of the light traveling along the first waveguide 107 may be coupled with the micro-resonator 102 in a first area S1 close to the first waveguide 107 and the micro-resonator 102 and travel into the micro-resonator 102. The light having a wavelength identical to the resonant wavelength of the micro-resonator 102 may travel in the micro-resonator 102, for example, in the counter-clockwise direction as marked with an arrow. The travel direction of the light inside the micro-resonator 102 may be changed according to the position of the first waveguide 107. For example, in the plan view of FIG. 2, when the first waveguide 107 is arranged on the right side of the micro-resonator 102, light may travel in the clockwise direction inside the micro-resonator 102.

A part of the resonant light in the micro-resonator 102 may be coupled with the second waveguide 108 in a second area S2 close to the second waveguide 108 and the micro-resonator 102 and travel into the second waveguide 108. Then, the light travelling along the second waveguide 108 may be incident on the photodetector 111. Accordingly, among the light emitted from the light source 109, light having the same wavelength as the resonant wavelength of the micro-resonator 102 may be detected by the photodetector 111 through the micro-resonator 102 and the second waveguide 108.

The resonant wavelength of the micro-resonator 102 may be determined by the temperature of the micro-resonator 102 in addition to the material, shape, and size of the micro-resonator 102. The temperature of the micro-resonator 102 may be changed according to an intensity of infrared light incident on the infrared absorber 103. When the infrared light is incident on the infrared absorber 103 arranged on the upper surface of the micro-resonator 102, the infrared absorber 103 may absorb the infrared light, and the temperature of the infrared absorber 103 may increase. Then, the heat of the infrared absorber 103 may be transmitted to the micro-resonator 102, and the temperature of the micro-resonator 102 may increase. As the micro-resonator 102 is thermally isolated by the thermal isolation bridge 106, the heat may not flow out quickly to the substrate 101, and stay in the micro-resonator 102 for a certain time. Accordingly, the temperature of the micro-resonator 102 may increase high enough to cause sufficient change in the resonant wavelength of the micro-resonator 102.

When the resonant wavelength of the micro-resonator 102 changes according to the temperature change of the micro-resonator 102, the intensity of light coupled in the first area S1 and the second area S2 may be changed. The degree of intensity change of the light may be determined by the wavelength distribution of the light frequency-modulated by the modulator 110 and the amount of change in the resonant wavelength of the micro-resonator 102. Such change in the intensity of light may be detected by the photodetector 111.

Based on the change in the intensity of light detected by the photodetector 111, the amount of change in the resonant wavelength of the micro-resonator 102 may be calculated. Based on the calculated amount of change in the resonant wavelength of the micro-resonator 102, the amount of change in the temperature of the micro-resonator 102 may be calculated. In addition, based on the amount of change in the temperature of the micro-resonator 102, the intensity of infrared light incident on the infrared absorber 103 may be calculated.

Figure 4A:
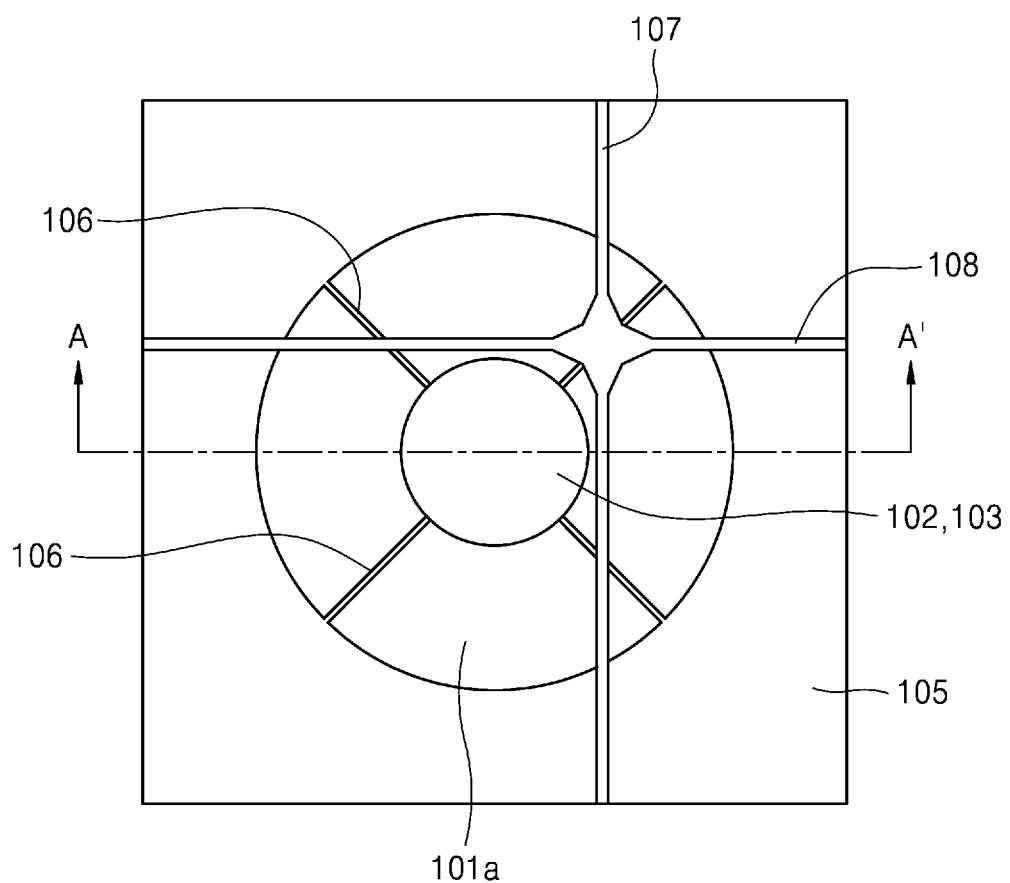
FIGS. 4A and 4B are respectively a plan view and a cross-sectional view taken along line A-A' of FIG. 4A to schematically illustrate a structure of an infrared detector according to another example embodiment.
Figure 4B:
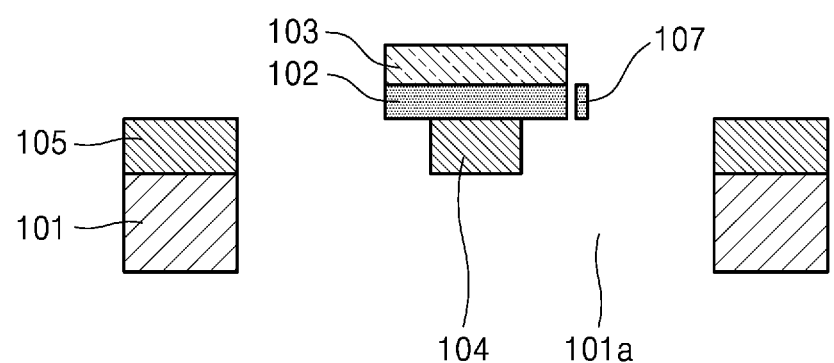

FIGS. 4A and 4B are respectively a plan view and a cross-sectional view taken along line A-A' of FIG. 4A to schematically illustrate a structure of an infrared detector according to another embodiment. In contrast to the embodiments illustrated in FIGS. 1A to 3 in which the first waveguide 107 is arranged on the left side of the micro-resonator 102, the first waveguide 107 may be arranged on the right side of the micro-resonator 102 as illustrated in FIGS. 4A and 4B. In this case, the light coupled with the micro-resonator 102 through the first waveguide 107 may travel in the clockwise direction inside the micro-resonator 102.

Figure 5A:
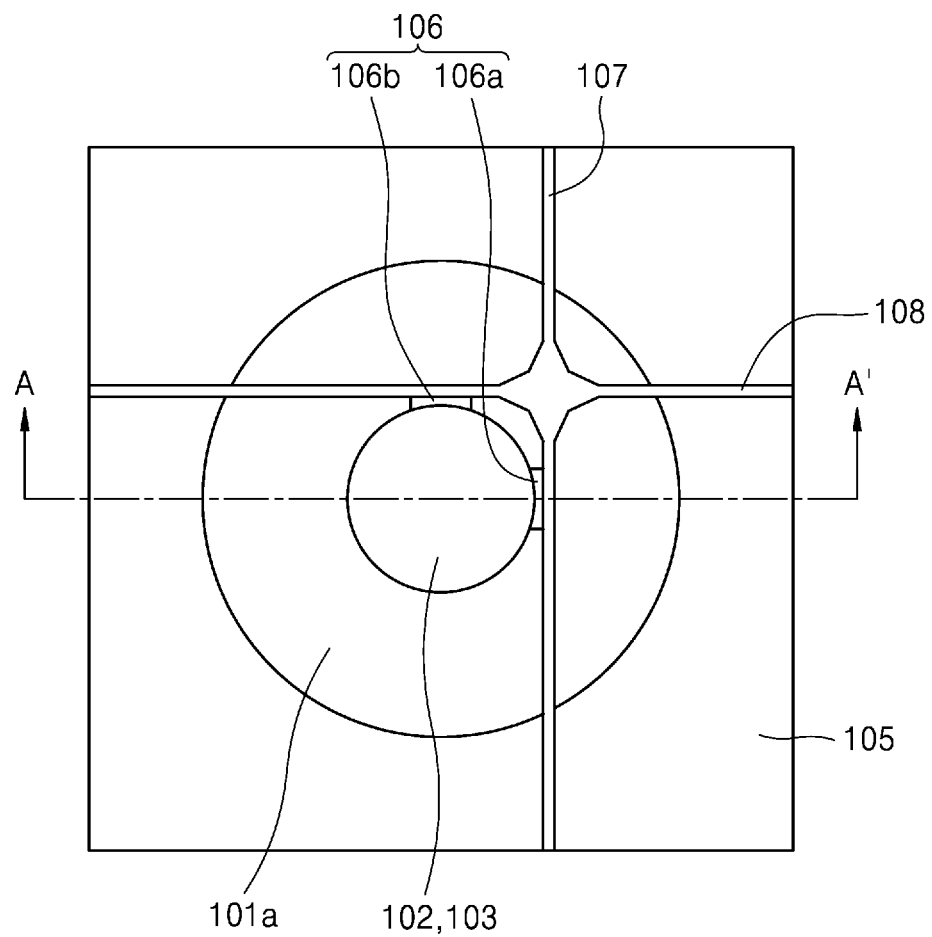
FIGS. 5A and 5B are respectively a plan view and a cross-sectional view taken along line A-A' of FIG. 5A to schematically illustrate a structure of an infrared detector according to another example embodiment.
Figure 5B:
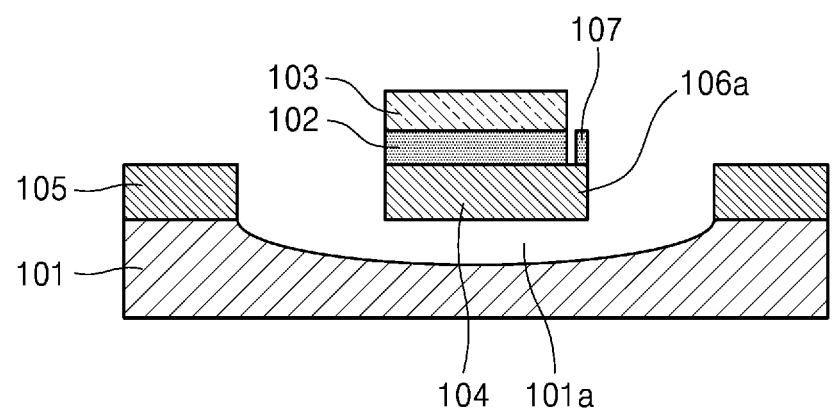

FIGS. 5A and 5B are respectively a plan view and a cross-sectional view taken along line A-A' of FIG. 5A to schematically illustrate a structure of an infrared detector according to another embodiment. In the embodiments described above, four thermal isolation bridges 106 may be arranged radially with respect to the center of the micro-resonator 102. The aforementioned embodiments also illustrate that the thermal isolation bridge 106 may extend between the support plate 104 and the bridge layer 105. Unlike the foregoing, the thermal isolation bridge 106 may extend between the support plate 104 and the lower surfaces of the first and second waveguides 107 and 108. For example, the thermal isolation bridge 106 may include a first thermal isolation bridge 106a extending between one lateral surface of the support plate 104 and the lower surface of the first waveguide 107 and a second thermal isolation bridge 106b extending between another lateral surface of the support plate 104 and the lower surface of the second waveguide 108. In the embodiment, the support plate 104, the micro-resonator 102, and the infrared absorber 103 may be supported and suspended by the first waveguide 107 and the second waveguide 108 through the first thermal isolation bridge 106a and the second thermal isolation bridge 106b.

In addition, although the aforementioned embodiments describe that the empty space 101a penetrates both of the upper surface and the lower surface of the substrate 101, the empty space 101a may also be formed by partially etching only the upper surface of the substrate 101 as illustrated in FIG. 5B. In this case, the bottom of the empty space 101a may be blocked by the lower surface of the substrate 101.

Figure 6A:
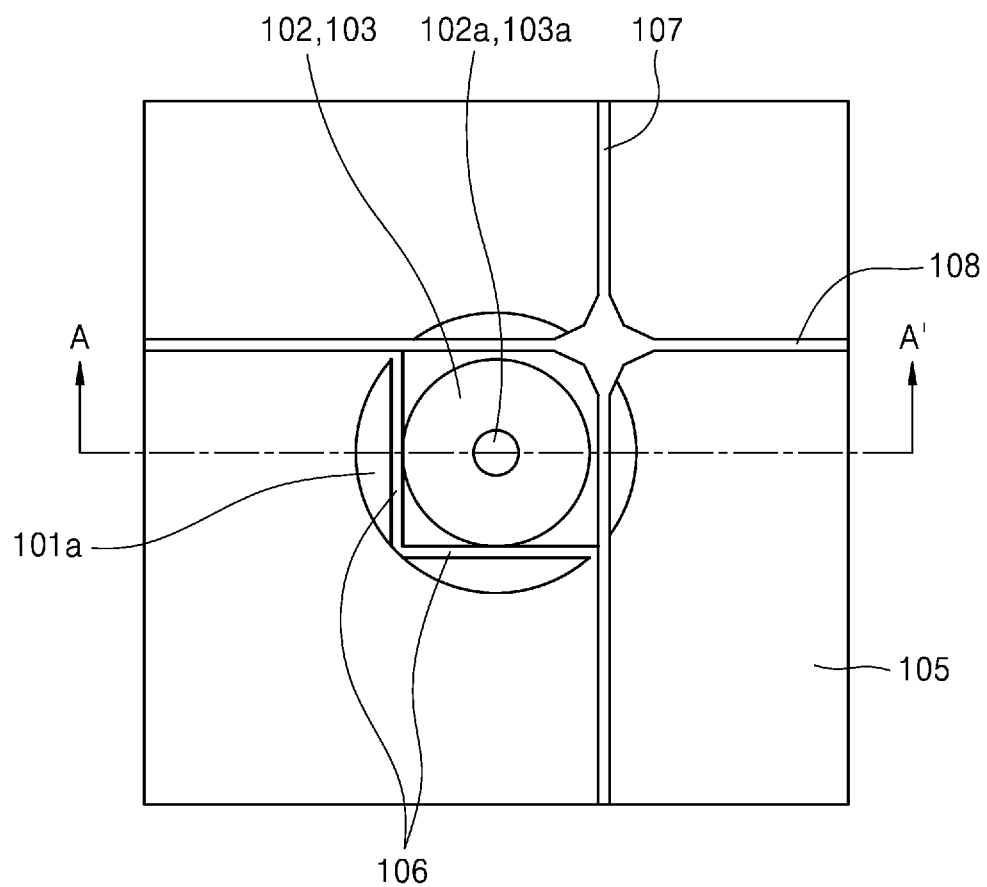
FIGS. 6A and 6B are respectively a plan view and a cross-sectional view taken along line A-A' of FIG. 6A to schematically illustrate a structure of an infrared detector according to another example embodiment.
Figure 6B:
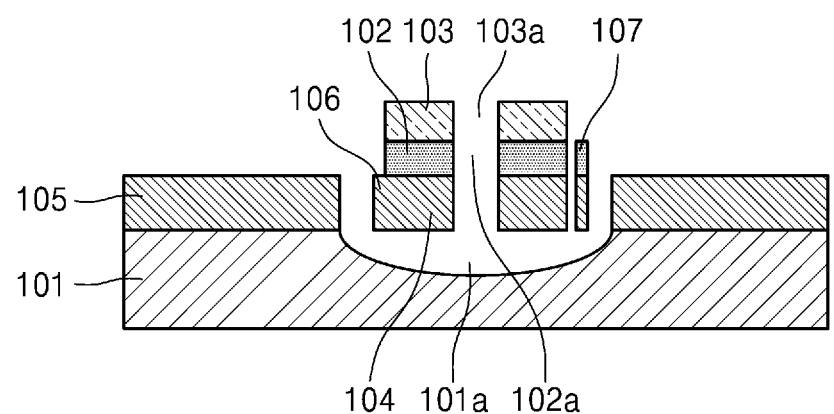

FIGS. 6A and 6B are respectively a plan view and a cross-sectional view taken along line A-A' of FIG. 6A to schematically illustrate a structure of an infrared detector according to another embodiment. With reference to FIGS. 6A and 6B, the thermal isolation bridge 106 may extend in the tangential direction of the micro-resonator 102. In this case, both ends of the thermal isolation bridge 106 may be connected to the bridge layer 105, and the center of the thermal isolation bridge 106 may be connected to the lateral surface of the support plate 104. FIG. 6A illustrates that two thermal isolation bridges 106 respectively extend in the 90° direction with respect to each other; however, this is only an example, and the number and extension direction of the plurality of thermal isolation bridges 106 may vary.

Moreover, as illustrated in FIGS. 6A and 6B, the micro-resonator 102 may include an opening 102a passing through the center of the micro-resonator 102. The infrared absorber 103 arranged on the micro-resonator 102 may also include an opening 103a passing through the center of the infrared absorber 103. The opening 102a of the micro-resonator 102 may be used for etching the layers under the micro-resonator 102.

Figure 7A:
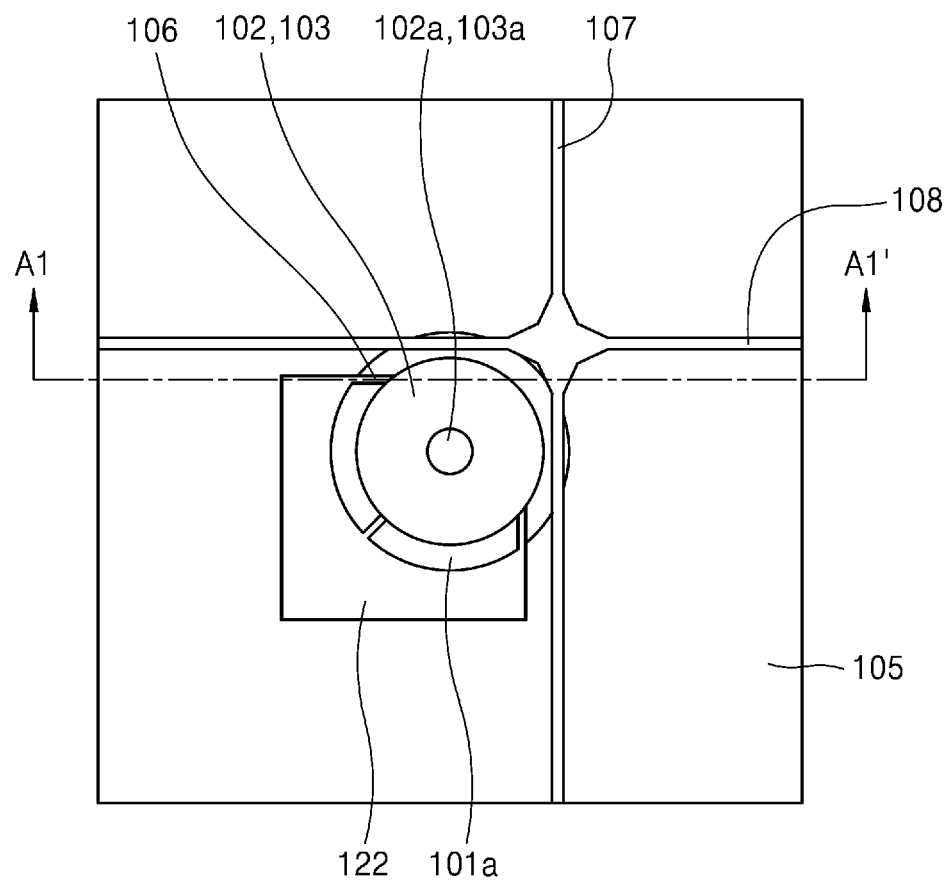
FIGS. 7A and 7B are respectively a plan view and a cross-sectional view taken along line A1-A1' of FIG. 7A to schematically illustrate a structure of an infrared detector according to another example embodiment.
Figure 7B:
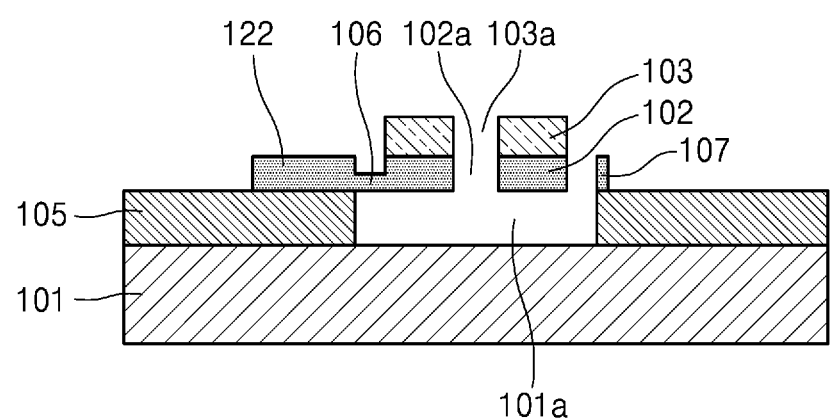

FIGS. 7A and 7B are respectively a plan view and a cross-sectional view taken along line A1-A1' of FIG. 7A to schematically illustrate a structure of an infrared detector according to another embodiment. Up to this point, it is described that the thermal isolation bridge 106 is integrated with the support plate 104 and the bridge layer 105 on the same plane and is formed of the same material as the support plate 104 and the bridge layer 105. However, the thermal isolation bridge 106 may be integrated with the micro-resonator 102. The first and second waveguides 107 and 108 may be disposed on the same plane and be formed of the same material as the micro-resonator 102. The thermal isolation bridge may also be formed of this same material.

With reference to FIGS. 7A and 7B, the infrared detector may further include a bridge fixing layer 122 arranged partially on the upper surface of the bridge layer 105. The bridge fixing layer 122 may be integrated with the thermal isolation bridge 106, the micro-resonator 102, and the first and second waveguides 107 and 108 on the same plane and be formed of the same material as the thermal isolation bridge 106, the micro-resonator 102, and the first and second waveguides 107 and 108. In an embodiment, the bridge fixing layer 122 may partially overhang an edge of the empty space 101a. The thermal isolation bridge 106 may extend between the bridge fixing layer 122 and the micro-resonator 102. In this case, the support plate 104 under the micro-resonator 102 may be omitted. The thermal isolation bridge 106 may have a thickness less than the thickness of the micro-resonator 102 to minimize the effects on the resonant wavelength of the micro-resonator 102. The thickness of the thermal isolation bridge 106 may be less than the thickness of the bridge fixing layer 122. FIG. 7A illustrates three thermal isolation bridges 106; however, the number of thermal isolation bridges 106 is not limited thereto. The thermal isolation bridge 106, the bridge fixing layer 122, the micro-resonator 102, the first waveguide 107, and the second waveguide 108 illustrated in FIGS. 7A and 7B may be formed simultaneously by patterning a single material.

As described above, the infrared detectors according to embodiments may include the first and second waveguides 107 and 108 and the micro-resonator 102 on the substrate 101 including a semiconductor material, such as a SOI substrate, and may have a structure in which the micro-resonator 102 is suspended through the thermal isolation bridge 106 extending in a direction parallel with the surface of the substrate 101. Accordingly, the infrared detectors may be mass-produced by the general semiconductor manufacturing process, which leads to miniaturization of the infrared detectors. For example, the infrared detector 100 illustrated in FIGS. 1A to 3 may be manufactured by sequentially stacking a material of the thermal isolation bridge 106, a material of the micro-resonator 102, and a material of the infrared absorber 103 on the substrate 101, patterning the material of the infrared absorber 103 to form the infrared absorber 103, patterning the material of the micro-resonator 102 to form the micro-resonator 102 and the first and second waveguides 107 and 108, patterning the material of the thermal isolation bridge 106 to form the support plate 104, the bridge layer 105, and the thermal isolation bridge 106, and then patterning the substrate 101 to form the empty space 101a.

According to embodiments, as the micro-resonator 102 is thermally isolated by the thermal isolation bridge 106, the thermal noise may be reduced, which leads to improved sensitivity of the infrared detectors. Moreover, as signals may be output through the first and second waveguides 107 and 108 optically coupled with the micro-resonator 102, the infrared detectors are compatible with readout integrated circuits of general image sensors. Accordingly, a miniaturized infrared image sensor with high sensitivity may be provided at a relatively low cost.

FIG. 8 is a schematic view of a structure of an infrared image sensor according to an embodiment. With reference to FIG. 8, an infrared image sensor 200 according to an embodiment may include a pixel array 210 including a plurality of infrared detection pixels 211 arranged in a 2D manner, a plurality of first waveguides 107 extending in a first direction, a plurality of second waveguides 108 extending in a second direction intersecting the first direction, a plurality of light sources 109 respectively configured to provide light to the plurality of first waveguides 107, a plurality of modulators 110 each of which is arranged between the first waveguide 107 and the light source 109 which correspond to each other, and a plurality of photodetectors 111 respectively connected to the plurality of second waveguides 108 and configured to measure an intensity of light transmitted through the plurality of second waveguides 108.

Figure 9A:
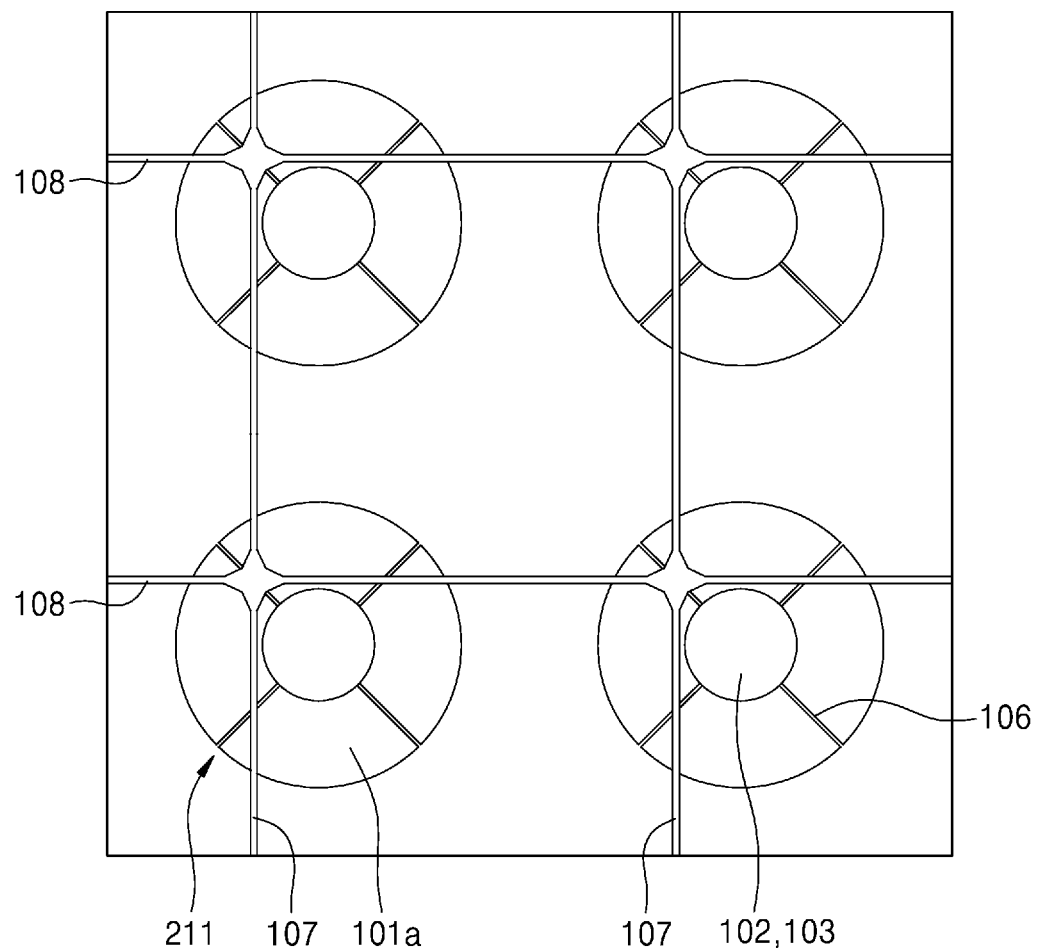
FIGS. 9A and 9B are respectively a plan view and a perspective view to schematically illustrate an arrangement of a plurality of infrared detection pixels in a pixel array of the infrared image sensor of FIG. 8.
Figure 9B:
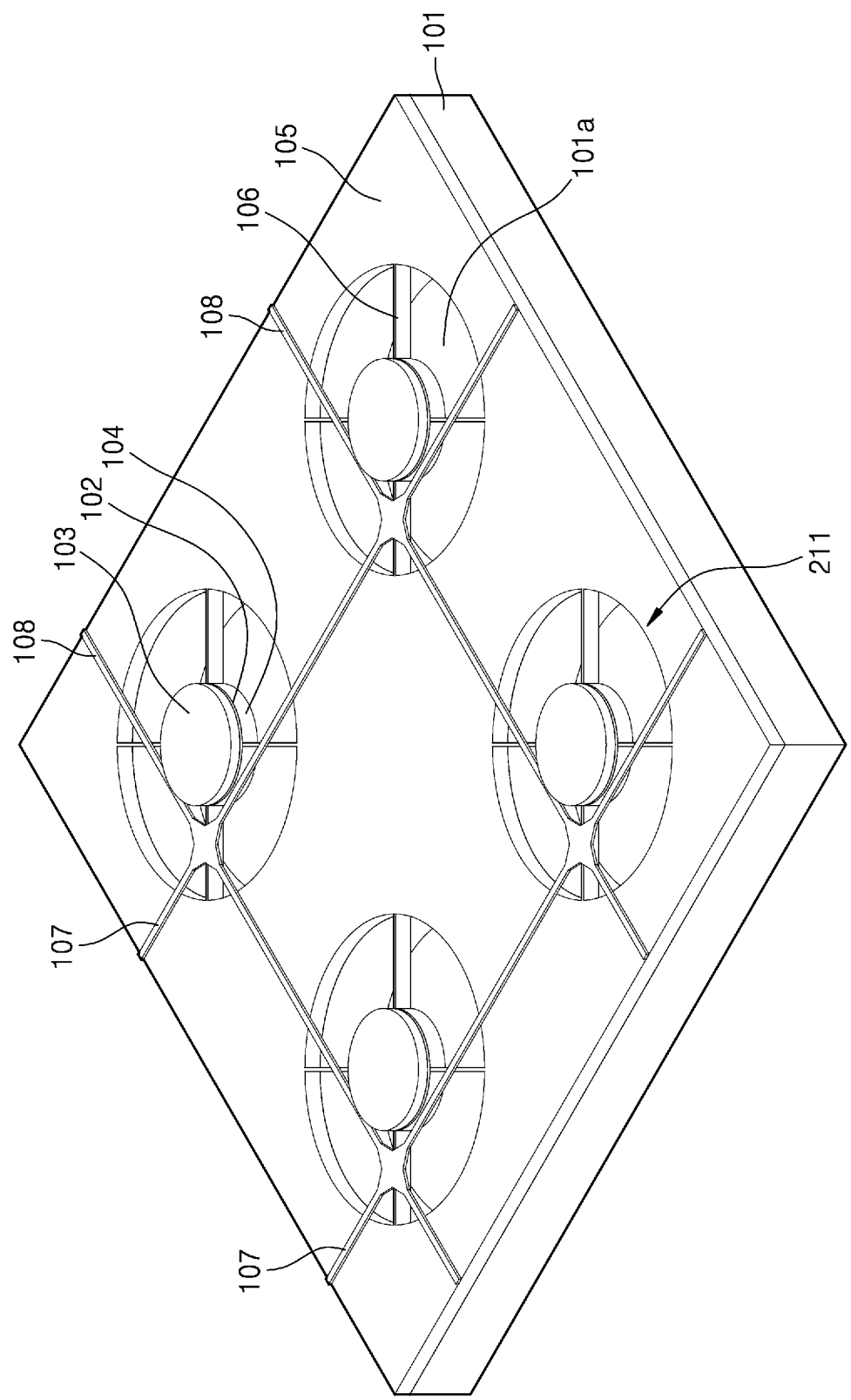

Each of the plurality of infrared detection pixels 211 may have the same structure as the infrared detectors described above. FIGS. 9A and 9B are respectively a plan view and a perspective view to schematically illustrate arrangement of the plurality of infrared detection pixels 211 in the pixel array 210 of the infrared image sensor 200 of FIG. 8. With reference to FIGS. 9A and 9B, each of the plurality of infrared detection pixels 211 may include the substrate 101 in which the empty space 101a is formed, the micro-resonator 102 suspended over the empty space 101a of the substrate 101, the infrared absorber 103 arranged on the micro-resonator 102, and the thermal isolation bridge 106 supporting the micro-resonator 102. In addition, each of the infrared detection pixels 211 may further include the support plate 104 arranged on the lower surface of the micro-resonator 102 and the bridge layer 105 arranged on the upper surface of the substrate 101. FIGS. 9A and 9B illustrate that the plurality of infrared detection pixels 211 have the structure shown in FIGS. 1A and 1B, however, the disclosure is not limited thereto, and the plurality of infrared detection pixels 211 may have one of the structures shown in FIGS. 4A to 7B.

The plurality of infrared detection pixels 211 may be arranged in a 2D manner along the plurality of rows and the plurality of columns. Each of the plurality of first waveguides 107 may be optically connected to the plurality of infrared detection pixels 211 arranged along a column. More specifically, each of the plurality of first waveguides 107 may be arranged to be optically coupled with the micro-resonator 102 in the plurality of infrared detection pixels 211 arranged along a column (e.g., in the first direction). Each of the plurality of second waveguides 108 may be optically connected to the plurality of infrared detection pixels 211 arranged along a row (e.g., in the second direction). More specifically, each of the plurality of second waveguides 108 may be arranged to be optically coupled with the micro-resonator 102 in the plurality of infrared detection pixels 211 arranged along a row. The plurality of first waveguides 107 and the plurality of second waveguides 108 may extend such that the plurality of first waveguides 107 intersect the plurality of second waveguides 108, and each of the plurality of infrared detection pixels 211 may be located adjacent to intersections between the plurality of first waveguides 107 and the plurality of second waveguides 108.

Light emitted from one light source of the plurality of light sources 109 may be frequency-modulated by the modulator 110 and travel along the corresponding first waveguide 107. Then, the light may be provided to the micro-resonator 102 in the plurality of infrared detection pixels 211 optically connected to the first waveguide 107. In other words, the light emitted from one light source of the plurality of light sources 109 may be provided to every infrared detection pixels 211 arranged along the column corresponding to the light source. For identification of the plurality of columns, the plurality of modulators 110 may frequency-modulate light to have different wavelength distributions from each other. For example, light frequency-modulated by the modulator 110 arranged in the first column and light frequency-modulated by the modulator 110 arranged in the second column may have different wavelength distributions from each other. Accordingly, light have different distributions may be provided to the plurality of infrared detection pixels 211 arranged along the plurality of columns.

Light emitted from the plurality of infrared detection pixels 211 arranged along a row may be detected by the photodetector 111 corresponding to the row along the second waveguide 108. In other words, each of the plurality of photodetectors 111 may detect light emitted from every infrared detection pixels 211 arranged along the corresponding column. Accordingly, light detected by each of the plurality of photodetectors 111 may be the sum of light output from the plurality of infrared detection pixels 211 arranged along one row in different columns.

The infrared image sensor 200 may further include a processor 220 configured to calculate a change in the resonant wavelength of the micro-resonator 102 of each of the plurality of infrared detection pixels 211 based on the output change of the plurality of photodetectors 111. An output signal of the plurality of photodetectors 111 may be provided to the processor 220. The processor 220 may have information about a wavelength distribution of light provided to the plurality of infrared detection pixels 211 respectively arranged in different columns. The processor 220 may identify the plurality of infrared detection pixels 211 respectively arranged in different columns along one row based on such information. Accordingly, the processor 220 may separately calculate the resonant wavelength change of the micro-resonator 102 of the plurality of infrared detection pixels 211 arranged in a 2D manner. Moreover, the processor 220 may directly control the plurality of light sources 109 or the plurality of modulators 110 to adjust the wavelength distribution of the light provided to the plurality of infrared detection pixels 211 respectively arranged in different columns. The processor 220 may calculate an intensity of infrared light incident onto each of the infrared detection pixels 211 based on the calculated resonant wavelength change.

As described above, as unique frequency-modulated light is provided for each column, there may be no need to define the resonant wavelengths of the micro-resonators 102 in the infrared image sensor 200 with a high degree of precision. Accordingly, the slight deviation among the resonant wavelengths of the plurality of micro-resonators 102 due to the tolerance in the manufacturing process of the infrared image sensor 200 may not significantly affect the operations of the infrared image sensor 200.

Figure 10A:
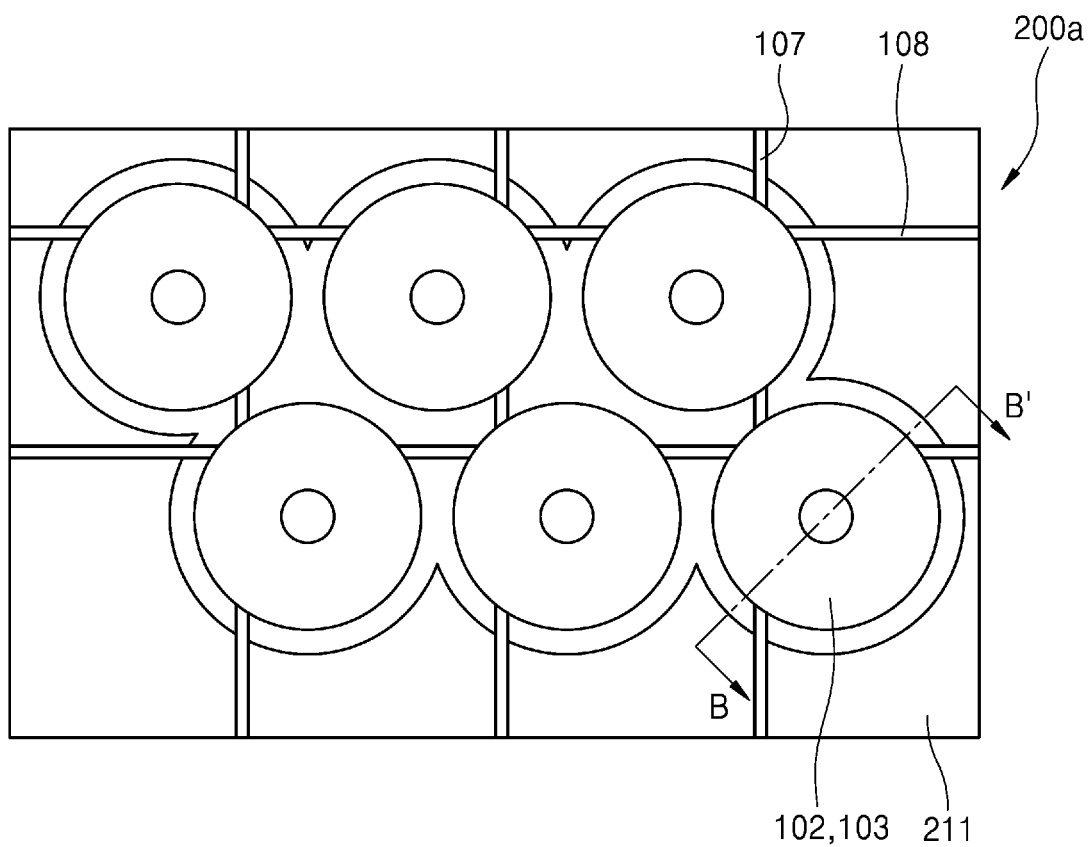
FIG. 10A is a plan view schematically illustrating an arrangement of a plurality of infrared detection pixels in an infrared image sensor according to another examples embodiment.

FIG. 10A is a plan view schematically illustrating arrangement of a plurality of infrared detection pixels in an infrared image sensor according to another embodiment. With reference to FIG. 10A, the plurality of infrared detection pixels 211 may be more concentrated to increase integration density of the infrared detection pixels 211 in an infrared image sensor 200a. For example, centers of the plurality of infrared detection pixels 211 arranged along one row may be respectively between the centers of two adjacent infrared detection pixels 211 among the plurality of infrared detection pixels 211 arranged along another row directly adjacent to the aforementioned row. In other words, the center of the infrared detection pixels 211 of the next row may be located at the midpoint between the centers of the two adjacent infrared detection pixels 211 in one row. In this case, the plurality of infrared detection pixels 211 arranged along one column (e.g., in the first direction) to be optically connected to one of the plurality of first waveguides 107 may be arranged in a zigzag manner. In this manner, the chip size of the infrared image sensor 200a may be reduced.

Figure 10B:
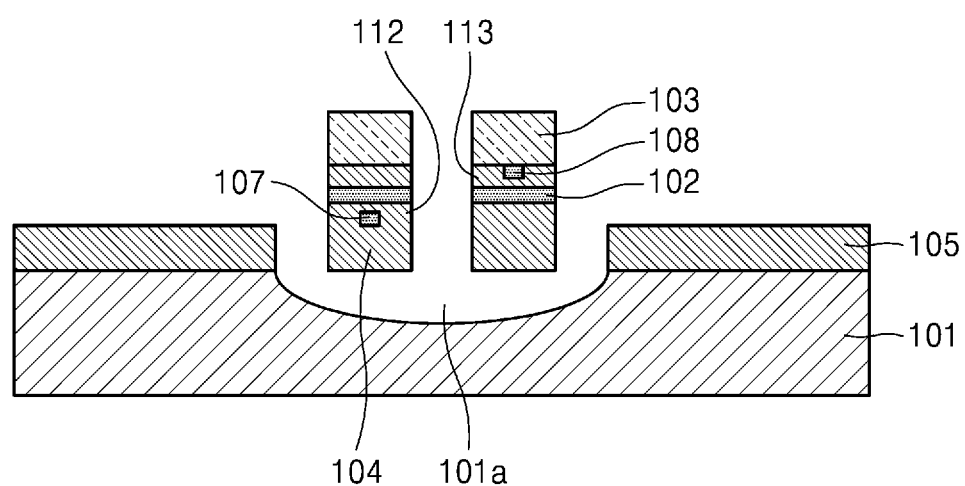
FIG. 10B is a cross-sectional view taken along line B-B' in FIG. 10A to schematically illustrate a structure of one infrared detection pixel illustrated in FIG. 10A.

When the plurality of infrared detection pixels 211 are concentrated as illustrated in FIG. 10A, the micro-resonator 102, the first waveguide 107, and the second waveguide 108 may be arranged at different layers from each other. FIG. 10B is a cross-sectional view taken along line B-B' of FIG. 10A to schematically illustrate a structure of one infrared detection pixel illustrated in FIG. 10A. With reference to FIG. 10B, the first waveguide 107 may be arranged at a layer between the support plate 104 and the micro-resonator 102, and the second waveguide 108 may be arranged at a layer between the micro-resonator 102 and the infrared absorber 103. In addition, each of the infrared detection pixels 211 may further include a first insulating layer 112 arranged between the support plate 104 and the micro-resonator 102 and a second insulating layer 113 arranged between the micro-resonator 102 and the infrared absorber 103. The first waveguide 107 may be buried in the first insulating layer 112, and the second waveguide 108 may be buried in the second insulating layer 113. Alternatively, the second waveguide 108 may be arranged at a layer between the support plate 104 and the micro-resonator 102, and the first waveguide 107 may be arranged at a layer between the micro-resonator 102 and the infrared absorber 103.

Figure 11:
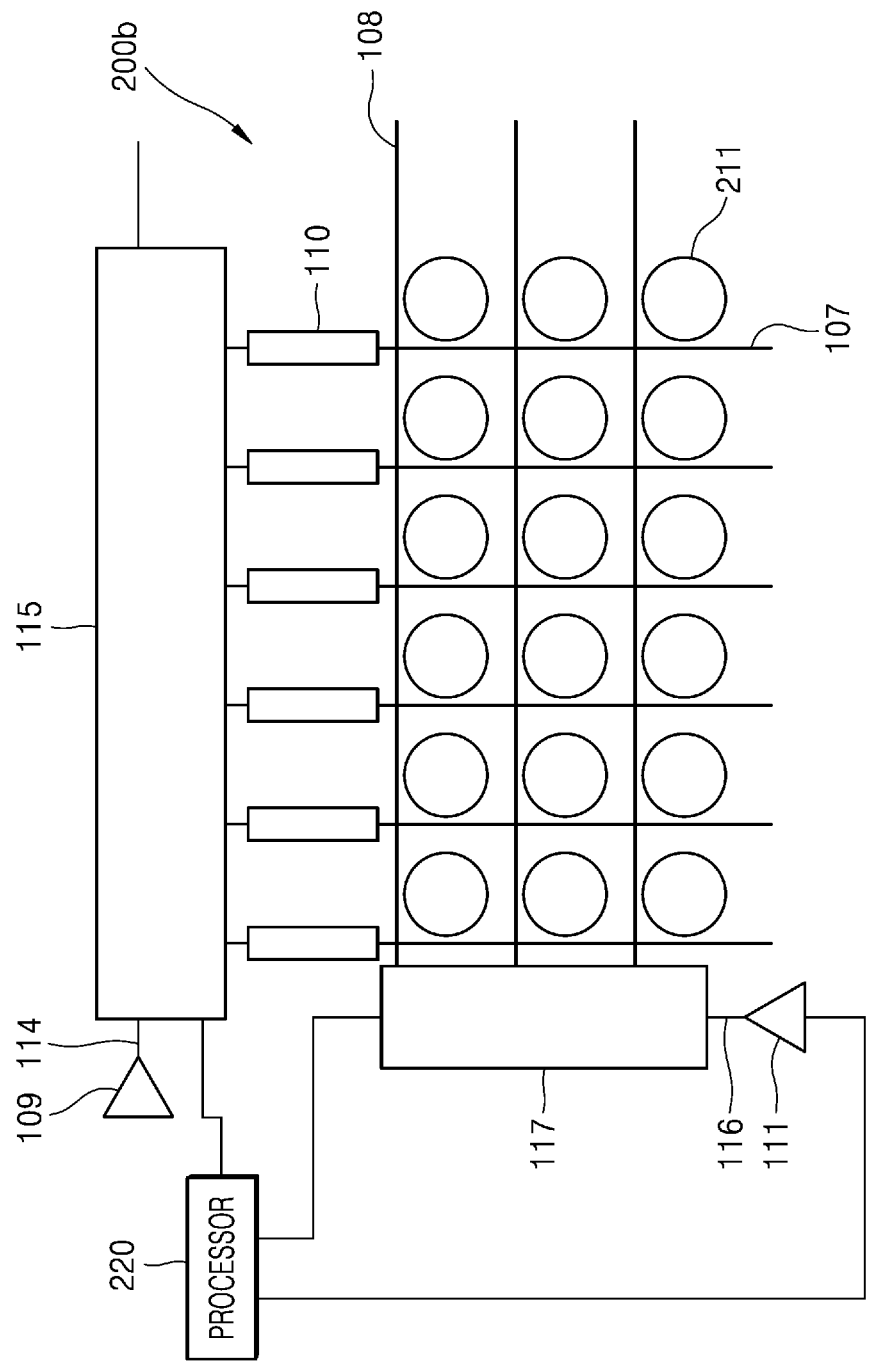
FIG. 11 is a schematic view of a structure of an infrared image sensor according to another example embodiment.

FIG. 11 is a schematic view of a structure of an infrared image sensor according to another embodiment. In the embodiment illustrated in FIG. 8, the plurality of light sources 109 may be respectively arranged in the plurality of columns, and the plurality of photodetectors 111 may be respectively arranged in the plurality of rows. However, an infrared image sensor 200b illustrated in FIG. 11 may include only one light source 109 and only one photodetector 111. With reference to FIG. 11, the infrared image sensor 200b may further include a third waveguide 114 connected to the light source 109, a demultiplexer 115 configured to provide light from the third waveguide 114 to any one of the plurality of modulators 110, a fourth waveguide 116 connected to the photodetector 111, and a multiplexer 117 configured to provide light from any one of the plurality of second waveguides 108 to the fourth waveguide 116. The demultiplexer 115 may be arranged on an optical path between the light source 109 and the plurality of first waveguides 107, and the plurality of modulators 110 may be arranged on an optical path between the demultiplexer 115 and the plurality of first waveguides 107. One end of each of the plurality of modulators 110 may be connected to the demultiplexer 115, and the other end of each of the plurality of modulators 110 may be connected to a corresponding first waveguide 107. The multiplexer 117 may be arranged on an optical path between the plurality of second waveguides 108 and the photodetector 111.

The demultiplexer 115 may select any one of the plurality of modulators 110 according to the control by the processor 220. Light emitted from the light source 109 may be provided to one modulator selected from the plurality of modulators 110 through the third waveguide 114 and the demultiplexer 115. The multiplexer 117 may select any one of the plurality of second waveguides 108 according to the control by the processor 220. Accordingly, light from the second waveguide selected among the plurality of second waveguides 108 may be incident on the photodetector 111 through the multiplexer 117 and the fourth waveguide 116. The processor 220 may control the demultiplexer 115 such that light is provided to the plurality of infrared detection pixels 211 sequentially along the plurality of columns. In addition, the processor 220 may control the multiplexer 117 such that light from the plurality of infrared detection pixels 211 is measured sequentially along the plurality of rows.

Figure 12:
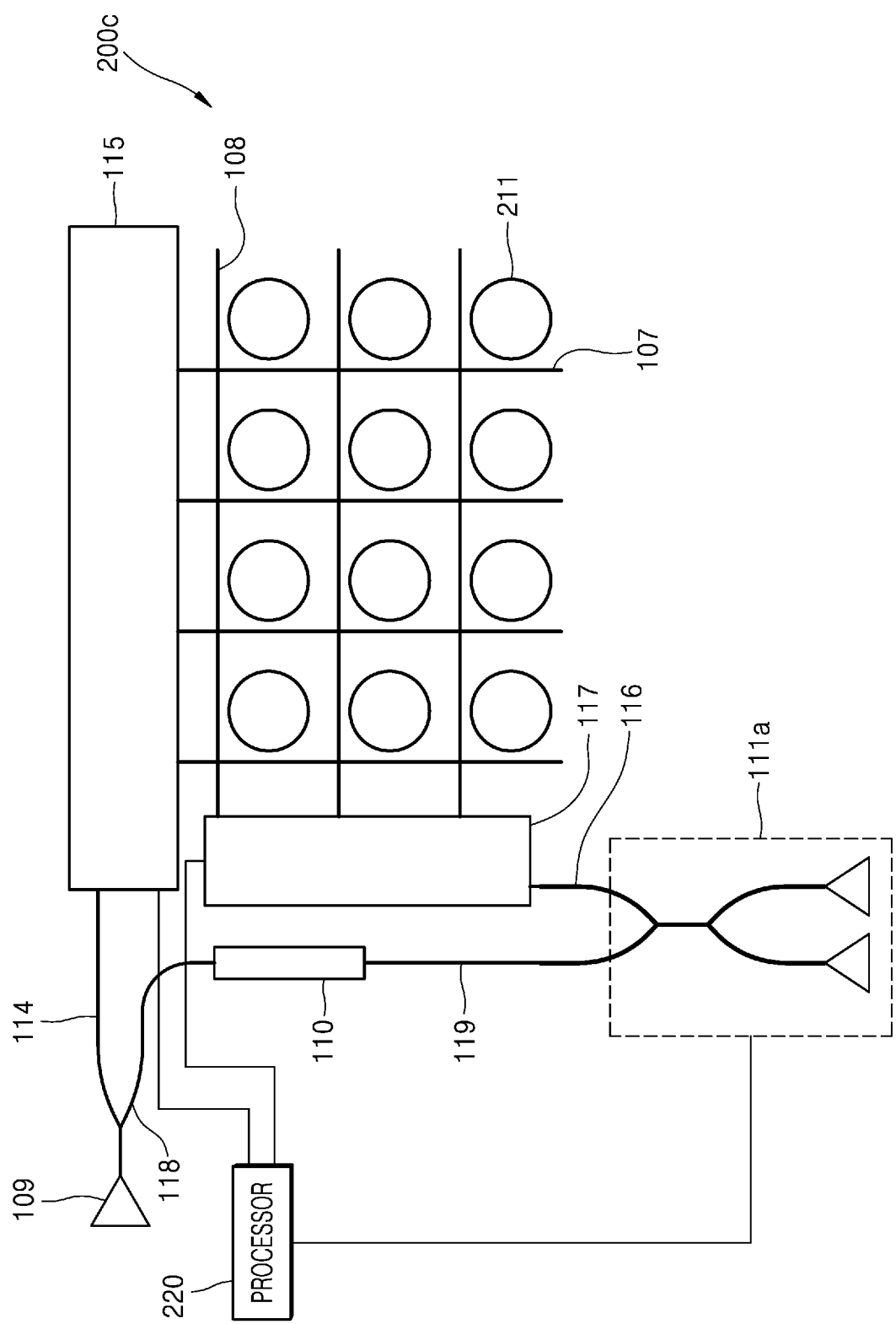
FIG. 12 is a schematic view of a structure of an infrared image sensor according to another example embodiment.

FIG. 12 is a schematic view of a structure of an infrared image sensor according to another embodiment. With reference to FIG. 12, in an infrared image sensor 200c, a modulator may not be arranged between the light source 109 and each of the first waveguides 107. Instead, the infrared image sensor 200c may include only one modulator 110 arranged on an optical path between the light source 109 and a photodetector 111a. For example, the infrared image sensor 200c may include a plurality of infrared detection pixels 211 arranged in a plurality of columns and a plurality of rows, first waveguides 107 arranged along the plurality of columns to provide light to the plurality of infrared detection pixels 211, second waveguides 108 arranged along the plurality of rows to output light from the plurality of infrared detection pixels 211, a light source 109, a demultiplexer 115 arranged on an optical path between the light source 109 and the plurality of first waveguides 107, a third waveguide 114 connected to an optical path between the light source 109 and the demultiplexer 115, a photodetector 111a, a multiplexer 117 arranged on an optical path between the photodetector 111a and the plurality of second waveguides 108, a fourth waveguide 116 connected to an optical path between the photodetector 111a and the multiplexer 117, a modulator 110 arranged between the light source 109 and the photodetector 111a, a fifth waveguide 118 connecting the light source 109 with the modulator 110, a sixth waveguide 119 connecting the modulator 110 with the photodetector 111a, and a processor 220.

According to an embodiment, the photodetector 111a may have two inputs. In other words, the frequency-modulated light from the light source 109 and the light from the infrared detection pixels 211 may be input to the photodetector 111a. For example, the photodetector 111a may be a balanced photodetector. In this case, the processor 220 may separately calculate the resonant wavelength change of the micro-resonator 102 in the infrared detection pixels 211 through homodyne detection by using the interference between the frequency-modulated light and the light from the infrared detection pixels 211.

Figure 13:
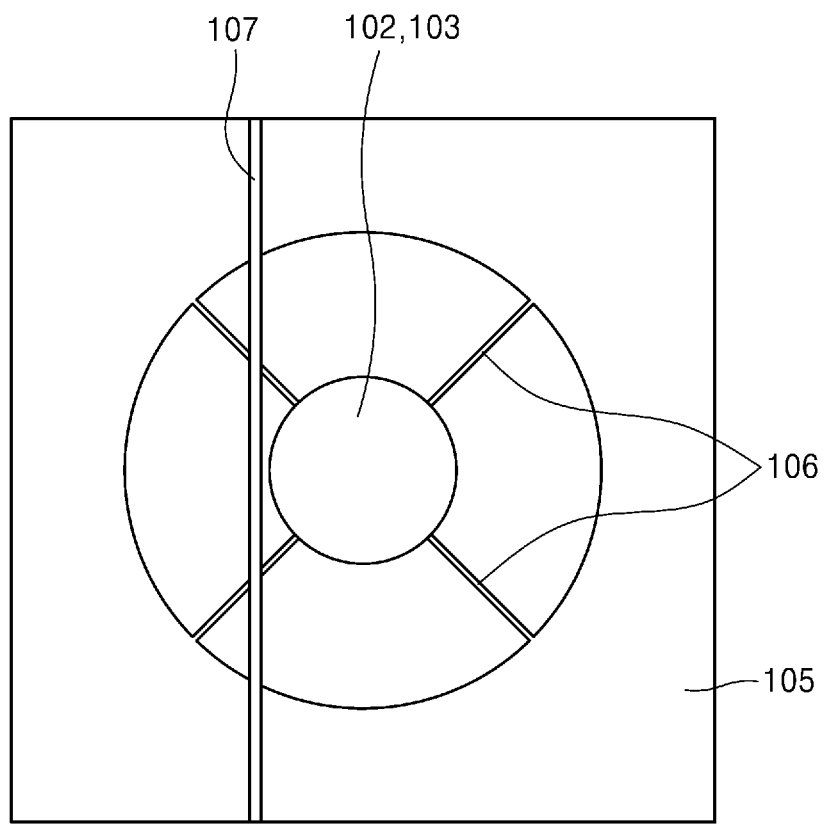
FIG. 13 is a schematic plan view of a structure of an infrared detector according to another example embodiment.

FIG. 13 is a schematic plan view of a structure of an infrared detector according to another embodiment. With reference to FIG. 13, an infrared detector may include only the first waveguide 107 connected to the light source and may not include the second waveguide 108. In other words, the infrared detector illustrated in FIG. 13 is different from the infrared detector 100 of FIG. 3 in that the infrared detector of FIG. 13 does not include the second waveguide 108.

Figure 14:
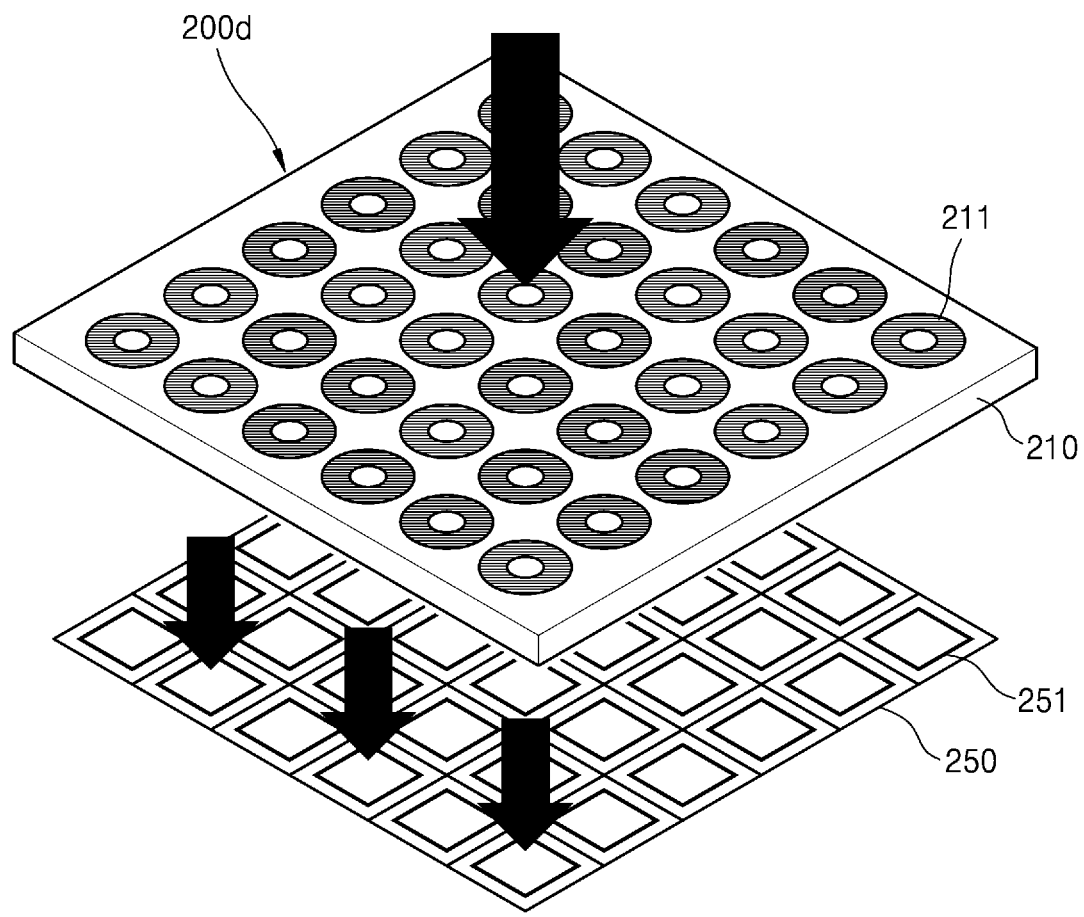
FIG. 14 is a schematic view of a structure of an infrared image sensor including a plurality of the infrared detector of FIG. 13.

FIG. 14 is a schematic view of a structure of an infrared image sensor including the plurality of infrared detectors of FIG. 13. With reference to FIG. 14, an infrared image sensor 200d may not include the photodetector 111, and include a visible light image sensor 250 instead. For example, the infrared image sensor 200d may include the pixel array 210 including the plurality of infrared detection pixels 211 and the visible light image sensor 250 facing the pixel array 210. The visible light image sensor 250 may include a plurality of visible light detection pixels 251 arranged in a 2D manner to respectively correspond to the plurality of infrared detection pixels 211. Each of the infrared detection pixels 211 may have the same structure as the infrared detector illustrated in FIG. 13. Although it is now shown in FIG. 14 for convenience sake, the infrared image sensor 200d may further include the plurality of first waveguides 107, the light source 109, the modulator 110, and the processor 220 as shown in FIG. 8 or 11.

The micro-resonator 102 of FIGS. 13 and 14 may be configured to have high efficiency at the third-order resonance. In other words, the micro-resonator 102 may be configured such that the third harmonic wave with respect to the first-order resonant wavelength resonates with the highest efficiency. For example, the micro-resonator 102 may be a ring-type resonator formed of $Si_3N_4$ in which third-order resonance occurs in the wavelength of about 500 nm. In this case, green light may be emitted from the micro-resonator 102. The visible light detection pixel 251 of the visible light image sensor 250 may measure an intensity of visible light emitted from the micro-resonator 102 of the corresponding infrared detection pixel 211. The processor 220 may calculate the resonant wavelength change of the micro-resonator 102 in the corresponding infrared detection pixel 211 based on the intensity change of the visible light measured by each of the visible light detection pixels 251. The infrared detector or the substrate of the infrared detection pixels 211 may be made of a transparent material, or the empty space may be formed to penetrate the upper surface and the lower surface of the substrate facing the micro-resonator 102 such that the light emitted from the micro-resonator 102 may reach the visible light image sensor 250.

Figure 15:
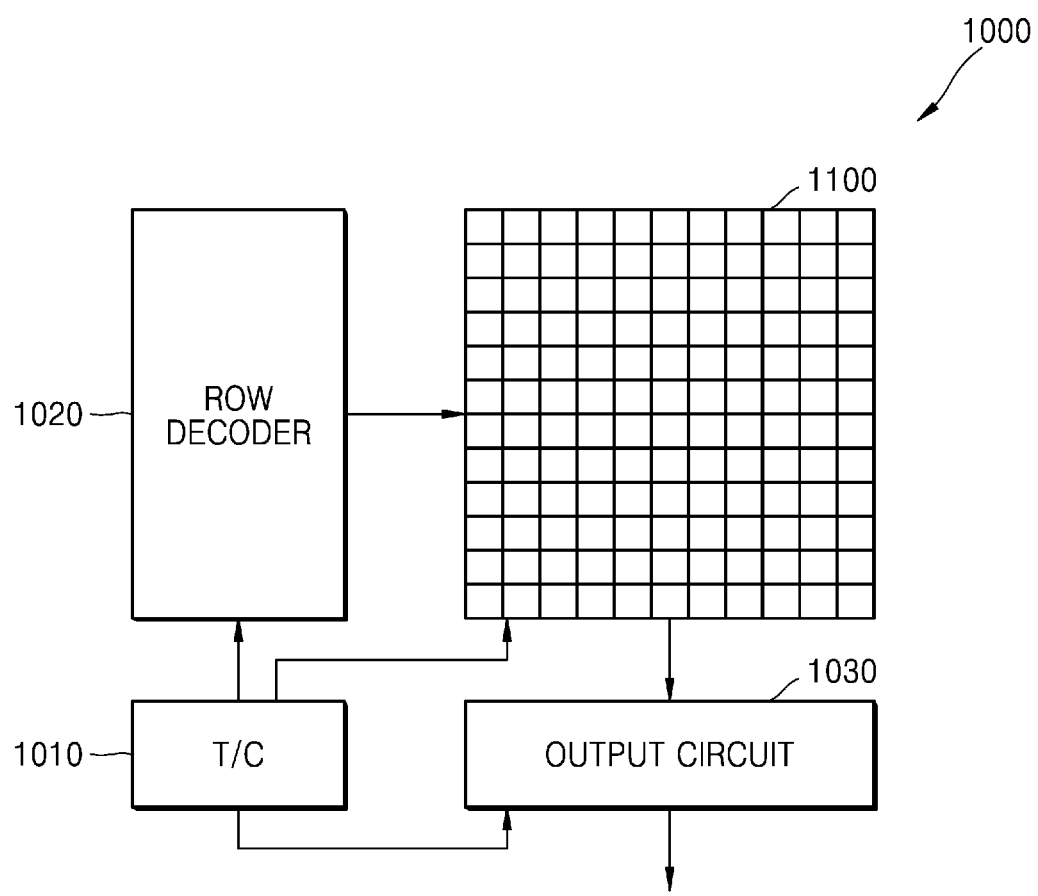
FIG. 15 is a schematic block diagram of an overall circuit configuration of an infrared image sensor according to some example embodiments.

FIG. 15 is a schematic block diagram of overall circuit configuration of an infrared image sensor according to some embodiments. With reference to FIG. 15, an infrared image sensor 1000 may include a pixel array 1100, a timing controller 1010, a row decoder 1020, and an output circuit 1030. The pixel array 1100 may include a plurality of infrared detection pixels arranged in a 2D manner along a plurality of rows and columns. The plurality of infrared detection pixels may include the aforementioned components.

The row decoder 1020 may select one of the rows of the pixel array 1100 in response to a row address signal output from the timing controller 1010. The output circuit 1030 may output a signal on a column basis from the pixel array 1100 arranged along the selected row. To this end, the output circuit 1030 may include a column decoder and an analog-to-digital converter (ADC). For example, the output circuit 1030 may include a plurality of ADCs respectively arranged between the column decoder and the pixel array 1100 for each column decoder, or an ADC arranged at an output terminal of the column decoder. The timing controller 1010, the row decoder 1020, and the output circuit 1030 may be implemented in one chip or separate chips. A processor for processing an image signal output through the output circuit 1030 may be implemented in a single chip together with the timing controller 1010, the row decoder 1020, and the output circuit 1030.

Figure 16:
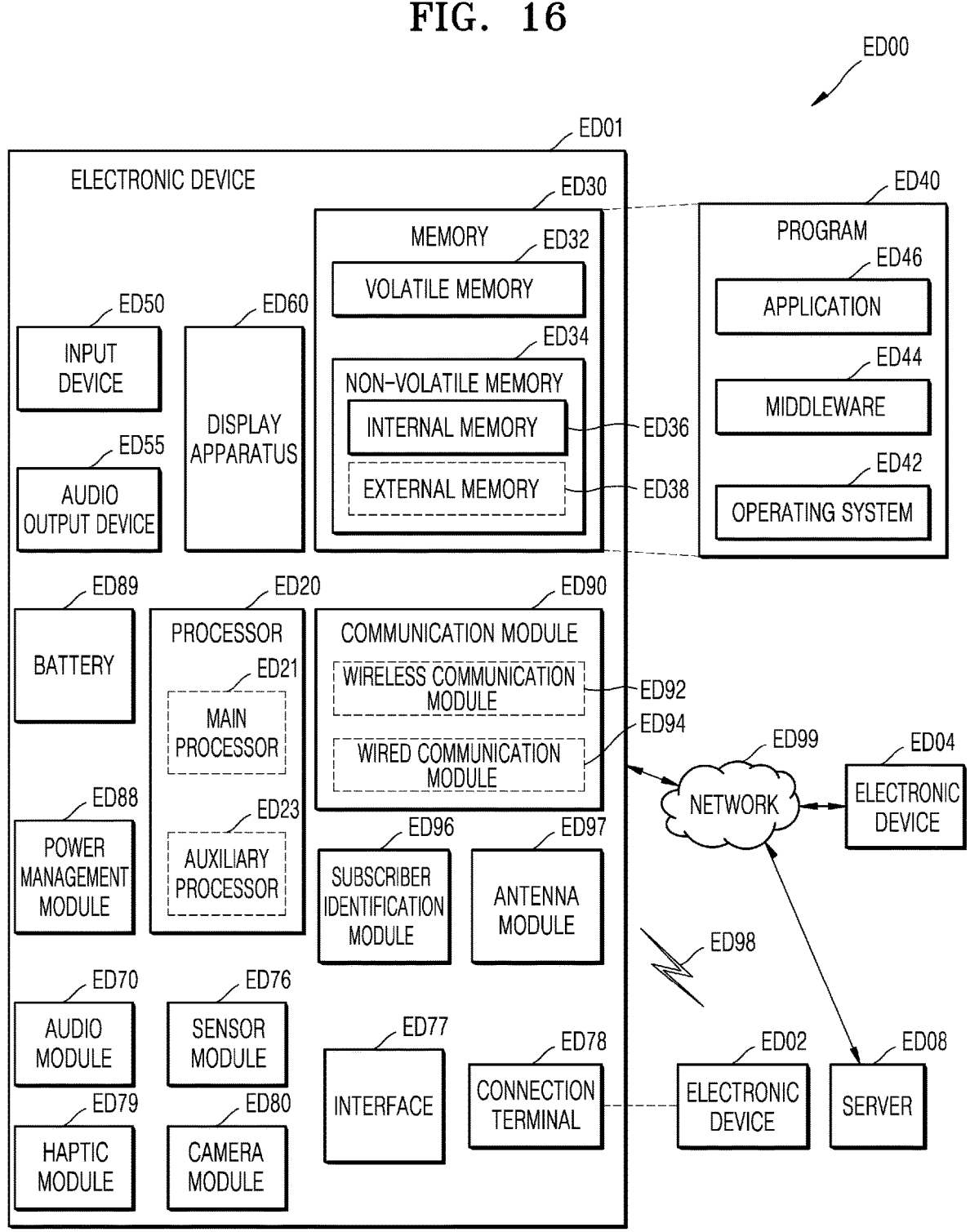
FIG. 16 is a schematic block diagram illustrating an example of an electronic device including an infrared image sensor.

FIG. 16 is a schematic block diagram illustrating an example of an electronic device including an infrared image sensor. With reference to FIG. 16, in a network environment ED00, the electronic device ED01 may communicate with another electronic device ED02 through a first network ED98 (e.g., short-range wireless communication network, etc.), or communicate with another electronic device ED04 and/or a server ED08 through a second network ED99 (e.g., long-range wireless communication network, etc.) The electronic device ED01 may communicate with the electronic device ED04 through the server ED08. The electronic device ED01 may include a processor ED20, a memory ED30, an input device ED50, an audio output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. In the electronic device ED01, some (the display device ED60, and the like) of constituent elements may be omitted or other constituent elements may be added. Some of the constituent elements may be implemented by one integrated circuit. For example, the sensor module ED76 (the aforementioned infrared detector, the aforementioned infrared image sensor, a fingerprint sensor, an iris sensor, an illuminance sensor, and the like) may be implemented by being embedded in the display device ED60 (a display, and the like).

The processor ED20 may control one or a plurality of other constituent elements (hardware and software constituent elements, and the like) of the electronic device ED01 connected to the processor ED20 by executing software (a program ED40, and the like), and perform various data processing or calculations. As part of the data processing or calculations, the processor ED20 may load, in a volatile memory ED32, commands and/or data received from other constituent elements (the sensor module ED76, the communication module ED90, and the like), process the command and/or data stored in the volatile memory ED32, and store result data in a non-volatile memory ED34. The processor ED20 may include a main processor ED21 (a central processing unit, an application processor, and the like) and an auxiliary processor ED23 (a graphics processing unit, an image signal processor, a sensor hub processor, a communication processor, and the like) that is operable independently of or together with the main processor ED21. The auxiliary processor ED23 may use less power than the main processor ED21 and may perform a specialized function.

Instead of the main processor ED21 when the main processor ED21 is in an inactive state (sleep state), or with the main processor ED21 when the main processor ED21 is in an active state (application execution state), the auxiliary processor ED23 may control functions and/or states related to some constituent elements (the display device ED60, the sensor module ED76, the communication module ED90, and the like) of the constituent elements of the electronic device ED01. The auxiliary processor ED23 (an image signal processor, a communication processor, and the like) may be implemented as a part of functionally related other constituent elements (the camera module ED80, the communication module ED90, and the like).

The memory ED30 may store various data needed by the constituent elements (the processor ED20, the sensor module ED76, and the like) of the electronic device ED01. The data may include, for example, software (the program ED40, and the like) and input data and/or output data about commands related thereto. The memory ED30 may include the volatile memory ED32 and/or the non-volatile memory ED34.

The program ED40 may be stored in the memory ED30 as software, and may include an operating system ED42, middleware ED44, and/or an application ED46.

The input device ED50 may receive commands and/or data to be used for constituent elements (the processor ED20, and the like) of the electronic device ED01, from the outside (a user, and the like) of the electronic device ED01. The input device ED50 may include a microphone, a mouse, a keyboard, and/or a digital pen (a stylus pen, and the like).

The audio output device ED55 may output an audio signal to the outside of the electronic device ED01. The audio output device ED55 may include a speaker and/or a receiver. The speaker may be used for general purposes such as multimedia playback or recording playback, and the receiver can be used to receive incoming calls. The receiver may be implemented by being coupled as a part of the speaker or by an independent separate device.

The display device ED60 may visually provide information to the outside of the electronic device ED01. The display device ED60 may include a display, a hologram device, or a projector, and a control circuit to control a corresponding device. The display device ED60 may include a touch circuitry set to detect a touch and/or a sensor circuit (a pressure sensor, and the like) set to measure the strength of a force generated by the touch.

The audio module ED70 may convert sound into electrical signals or reversely electrical signals into sound. The audio module ED70 may obtain sound through the input device ED50, or output sound through a speaker and/or a headphone of another electronic device (the electronic device ED02, and the like) connected to the audio output device ED55 and/or the electronic device ED01 in a wired or wireless manner.

The sensor module ED76 may detect an operation state (power, temperature, and the like) of the electronic device ED01, or an external environment state (a user state, and the like), and generate an electrical signal and/or a data value corresponding to a detected state. The sensor module ED76 may include a gesture sensor, a gyro sensor, a barometric pressure sensor, a magnetic sensor, an acceleration sensor, a grip sensor, a proximity sensor, a color sensor, the aforementioned infrared detector, the aforementioned infrared image sensor, a biometric sensor, a temperature sensor, a humidity sensor, and/or an illuminance sensor.

The interface ED77 may support one or a plurality of specified protocols used for the electronic device ED01 to be connected to another electronic device (the electronic device ED02, and the like) in a wired or wireless manner. The interface ED77 may include a high definition multimedia interface (HDMI), a universal serial bus (USB) interface, an SD card interface, and/or an audio interface.

A connection terminal ED78 may include a connector for the electronic device ED01 to be physically connected to another electronic device (the electronic device ED02, and the like). The connection terminal ED78 may include an HDMI connector, a USB connector, an SD card connector, and/or an audio connector (a headphone connector, and the like).

The haptic module ED79 may convert electrical signals into mechanical stimuli (vibrations, movements, and the like) or electrical stimuli that are perceivable by a user through tactile or motor sensations. The haptic module ED79 may include a motor, a piezoelectric device, and/or an electrical stimulation device.

The camera module ED80 may capture a still image and a video. The camera module ED80 may include a lens assembly including one or a plurality of lenses, image sensors, image signal processors, and/or flashes. The lens assembly included in the camera module ED80 may collect light emitted from a subject for image capturing.

The power management module ED88 may manage power supplied to the electronic device ED01. The power management module ED88 may be implemented as a part of a power management integrated circuit (PMIC).

The battery ED89 may supply power to the constituent elements of the electronic device ED01. The battery ED89 may include non-rechargeable primary cells, rechargeable secondary cells, and/or fuel cells.

The communication module ED90 may establish a wired communication channel and/or a wireless communication channel between the electronic device ED01 and another electronic device (the electronic device ED02, the electronic device ED04, the server ED08, and the like), and support a communication through an established communication channel. The communication module ED90 may be operated independent of the processor ED20 (the application processor, and the like), and may include one or a plurality of communication processors supporting a wired communication and/or a wireless communication. The communication module ED90 may include a wireless communication module ED92 (a cellular communication module, a short-range wireless communication module, a global navigation satellite system (GNSS) communication module, and the like), and/or a wired communication module ED94 (a local area network (LAN) communication module, a power line communication module, and the like). Among the above communication modules, a corresponding communication module may communicate with another electronic device through the first network ED98 (a short-range communication network such as Bluetooth, WiFi Direct, or infrared data association (IrDA)) or the second network ED99 (a long-range communication network such as a cellular network, the Internet, or a computer network (LAN, WAN, and the like)). These various types of communication modules may be integrated into one constituent element (a single chip, and the like), or may be implemented as a plurality of separate constituent elements (multiple chips). The wireless communication module ED92 may verify and authenticate the electronic device ED01 in a communication network such as the first network ED98 and/or the second network ED99 by using subscriber information (an international mobile subscriber identifier (IMSI), and the like) stored in the subscriber identification module ED96.

The antenna module ED97 may transmit signals and/or power to the outside (another electronic device, and the like) or receive signals and/or power from the outside. An antenna may include an emitter formed in a conductive pattern on a substrate (a printed circuit board (PCB), and the like). The antenna module ED97 may include one or a plurality of antennas. When the antenna module ED97 includes a plurality of antennas, the communication module ED90 may select, from among the antennas, an appropriate antenna for a communication method used in a communication network such as the first network ED98 and/or the second network ED99. Signals and/or power may be transmitted or received between the communication module ED90 and another electronic device through the selected antenna. Other parts (an RFIC, and the like) than the antenna may be included as a part of the antenna module ED97.

Some of the constituent elements may be connected to each other through a communication method between peripheral devices (a bus, general purpose input and output (GPIO), a serial peripheral interface (SPI), a mobile industry processor interface (MIPI), and the like) and may mutually exchange signals (commands, data, and the like).

The command or data may be transmitted or received between the electronic device ED01 and the external electronic device ED04 through the server ED08 connected to the second network ED99. The electronic devices ED02 and ED04 may be of a type that is the same as or different from the electronic device ED01. All or a part of operations executed in the electronic device ED01 may be executed in one or a plurality of the electronic devices (ED02, ED04, and ED08). For example, when the electronic device ED01 needs to perform a function or service, the electronic device ED01 may request one or a plurality of electronic devices to perform part of the whole of the function or service, instead of performing the function or service. The one or a plurality of the electronic devices receiving the request may perform additional function or service related to the request, and transmit a result of the performance to the electronic device ED01. To this end, cloud computing, distributed computing, and/or client-server computing technology may be used.

The infrared detector described above may include on the SOI substrate the waveguide and the micro-resonator which are formed of a semiconductor material, and may have a structure in which the micro-resonator is suspended by the thermal isolation bridge extending in a direction parallel with the surface of the substrate. Accordingly, the infrared detector may be mass-produced by the general semiconductor manufacturing process, which leads to miniaturization of the infrared detector. Moreover, as the micro-resonator is thermally isolated by the thermal isolation bridge, the thermal noise may be reduced, and the sensitivity of the infrared detector may be improved. In addition, as the signals may be output through the waveguides optically coupled with the micro-resonator, the infrared detector may be compatible with a readout integrated circuit of general image sensors. Accordingly, a miniaturized infrared image sensor with high sensitivity may be provided at a relatively low cost.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. An infrared detector comprising:
   a substrate in which a void is formed;
   a micro-resonator disposed over the void of the substrate;
   an infrared absorber disposed on an upper surface of the micro-resonator;
   a thermal isolation bridge supporting the micro-resonator;
   a first waveguide optically coupled with the micro-resonator;
   a second waveguide intersecting the first waveguide and optically coupled with the micro-resonator;
   a light source optically coupled with the first waveguide; and
   a photodetector optically coupled with the second waveguide.

2. The infrared detector of claim 1, further comprising a modulator disposed on an optical path between the light source and the first waveguide and configured to frequency-modulate light emitted from the light source.

3. The infrared detector of claim 1, further comprising:
   a support plate disposed on a lower surface of the micro-resonator; and
   a bridge layer disposed on an upper surface of the substrate,
   wherein the support plate, the bridge layer, and the thermal isolation bridge are formed in an integrated manner on a same plane.

4. The infrared detector of claim 3, wherein the thermal isolation bridge extends between the support plate and the bridge layer.

5. The infrared detector of claim 3, wherein the thermal isolation bridge comprises: a first thermal isolation bridge extending between a lateral surface of the support plate and a lower surface of the first waveguide; and a second thermal isolation bridge extending between another lateral surface of the support plate and a lower surface of the second waveguide.

6. The infrared detector of claim 1, further comprising:
   a support plate disposed below the micro-resonator;
   a first insulating layer disposed between the support plate and the micro-resonator; and
   a second insulating layer disposed between the micro-resonator and the infrared absorber,
   wherein the first waveguide is disposed in the first insulating layer and the second waveguide is disposed in the second insulating layer.

7. The infrared detector of claim 1, further comprising a bridge fixing layer integrated with the thermal isolation bridge, the micro-resonator, and the first and second waveguides on a same plane,
   wherein the thermal isolation bridge extends between the bridge fixing layer and the micro-resonator.

8. The infrared detector of claim 1, wherein the micro-resonator is in the shape of a circular flat disc having a diameter or width of at least 1 μm and not more than 20 μm.

9. The infrared detector of claim 1, wherein the first waveguide, the second waveguide, and the micro-resonator include a same material, and are arranged on a same plane.

10. An infrared image sensor comprising:
    a pixel array comprising a plurality of infrared detection pixels arranged in a two-dimensional (2D) manner;
    a plurality of first waveguides extending in a first direction;
    a plurality of second waveguides extending in a second direction which intersects the first direction;
    a light source configured to provide light to the plurality of first waveguides; and
    a photodetector configured to measure an intensity of light transmitted through the plurality of second waveguides,
    wherein each of the plurality of infrared detection pixels comprises:
    a substrate in which a void is formed;
    a micro-resonator disposed over the void of the substrate;
    an infrared absorber disposed on an upper surface of the micro-resonator; and
    a thermal isolation bridge supporting the micro-resonator, and wherein the plurality of first waveguides are optically coupled with the micro-resonators of the plurality of infrared detection pixels arranged in the first direction, respectively, and the plurality of second waveguides are optically coupled with the micro-resonators in the plurality of infrared detection pixels arranged in the second direction, respectively.

11. The infrared image sensor of claim 10, further comprising a processor configured to calculate a change in a resonant wavelength of the micro-resonator of each of the plurality of infrared detection pixels, based on a change in an output of the photodetector.

12. The infrared image sensor of claim 10, wherein the light source comprises a plurality of light sources configured to provide light to each of the plurality of first waveguides, and the photodetector comprises a plurality of photodetectors respectively connected to the plurality of second waveguides.

13. The infrared image sensor of claim 12, further comprising a plurality of modulators each arranged between the first waveguide and the light source which correspond to each other, wherein the plurality of modulators frequency-modulate light to have different wavelength distributions from each other.

14. The infrared image sensor of claim 10, wherein the plurality of infrared detection pixels arranged in the first direction to be optically coupled with one of the plurality of first waveguides are arranged in a zigzag form.

15. The infrared image sensor of claim 10, further comprising:

a demultiplexer disposed on an optical path between the light source and the plurality of first waveguides; and a multiplexer disposed on an optical path between the plurality of second waveguides and the photodetector.

16. The infrared image sensor of claim 15, further comprising a plurality of modulators arranged on an optical path between the demultiplexer and the plurality of first waveguides and respectively connected to corresponding first waveguides of the plurality of first waveguides, wherein the plurality of modulators frequency-modulate light to have different wavelength distributions from each other.

17. The infrared image sensor of claim 15, further comprising a modulator disposed on an optical path between the light source and the photodetector.

18. The infrared image sensor of claim 10, wherein each of the plurality of infrared detection pixels comprises:

a support plate disposed on a lower surface of the micro-resonator; and a bridge layer disposed on an upper surface of the substrate, wherein the support plate, the bridge layer, and the thermal isolation bridge are formed in an integrated manner on a same plane.

19. The infrared image sensor of claim 10, wherein the plurality of first waveguides, the plurality of second waveguides, and the micro-resonator include a same material, and are arranged on a same plane.

20. An infrared image sensor comprising:

a pixel array comprising a plurality of infrared detection pixels arranged in a two-dimensional (2D) manner;

a plurality of first waveguides extending in a first direction;

a light source configured to provide light to the plurality of first waveguides; and a visible light image sensor facing the pixel array and comprising a plurality of visible light detection pixels arranged in a 2D manner to respectively correspond to the plurality of infrared detection pixels, wherein each of the plurality of infrared detection pixels comprises:

a substrate in which a void is formed;

a micro-resonator disposed over the void of the substrate;

an infrared absorber disposed on an upper surface of the micro-resonator; and a thermal isolation bridge supporting the micro-resonator, and wherein the plurality of first waveguides are optically coupled with the micro-resonators of the plurality of infrared detection pixels arranged in the first direction, respectively.

* * * * *